(12) United States Patent
Oishi et al.

(10) Patent No.: US 7,325,391 B1
(45) Date of Patent: Feb. 5, 2008

(54) BICYCLE CHAIN

(75) Inventors: Toshinari Oishi, Osaka (JP); Yusuke Nishimoto, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/681,503

(22) Filed: Mar. 2, 2007

(51) Int. Cl.
*F16G 13/00* (2006.01)
(52) U.S. Cl. ............... 59/5; 59/4; 59/78; 474/206; 474/230; 474/231
(58) Field of Classification Search .......... 474/206, 474/212, 213, 215, 230, 231; 59/4, 5, 78, 59/84
See application file for complete search history.

(56) References Cited

U.S. PATENT DOCUMENTS

| | | | |
|---|---|---|---|
| 4,265,134 A | 5/1981 | Dupoyet | |
| 4,596,539 A | 6/1986 | Yamasaki | |
| 4,642,078 A * | 2/1987 | Dupoyet | 474/231 |
| 5,066,265 A * | 11/1991 | Wu | 474/206 |
| 5,073,153 A * | 12/1991 | Wu | 474/206 |
| 5,226,857 A | 7/1993 | Ono et al. | |
| 5,346,006 A * | 9/1994 | Wu | 474/212 |
| 5,362,282 A | 11/1994 | Lickton | |
| 5,437,577 A * | 8/1995 | Wu | 474/230 |
| 5,465,568 A * | 11/1995 | Wang | 59/78 |
| 5,741,196 A | 4/1998 | Campagnolo | |
| 6,110,064 A | 8/2000 | Guichard | |
| 7,267,220 B2 * | 9/2007 | Wang | 59/4 |
| 2002/0173395 A1 | 11/2002 | Reiter et al. | |
| 2005/0020394 A1 | 1/2005 | Valle | |

* cited by examiner

*Primary Examiner*—David B Jones
(74) *Attorney, Agent, or Firm*—Global IP Counselors, LLP

(57) ABSTRACT

A bicycle chain has an outer link with two outer link plates, an inner link formed with two inner link plates and a link pin connecting adjacent ones of the together. The link plates are configured to aid in smoothly shifting a chain moves between sprockets. The outer link plates have the outer link peripheral edges that are shaped differently. One of the outer link plates has an exteriorly facing surface with a first chamfered outer edge portion extending along a section of its outer link peripheral edge at a first end portion and a first reduced area part having a reduced radial dimension with respect to a radial dimension of the first end portion lying along a longitudinal axis. The inner link plates have center connecting portions with different minimum widths.

15 Claims, 28 Drawing Sheets

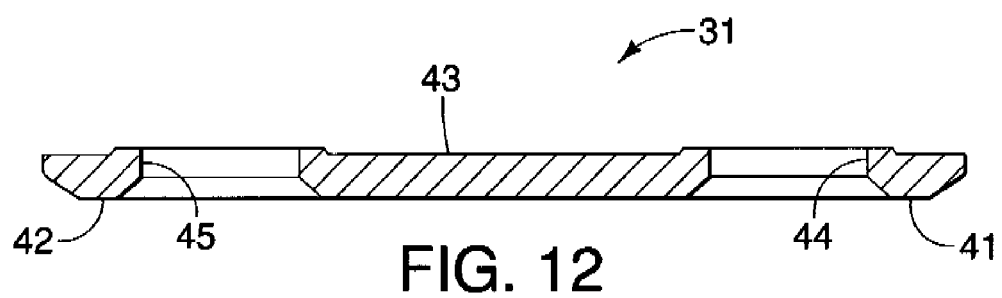
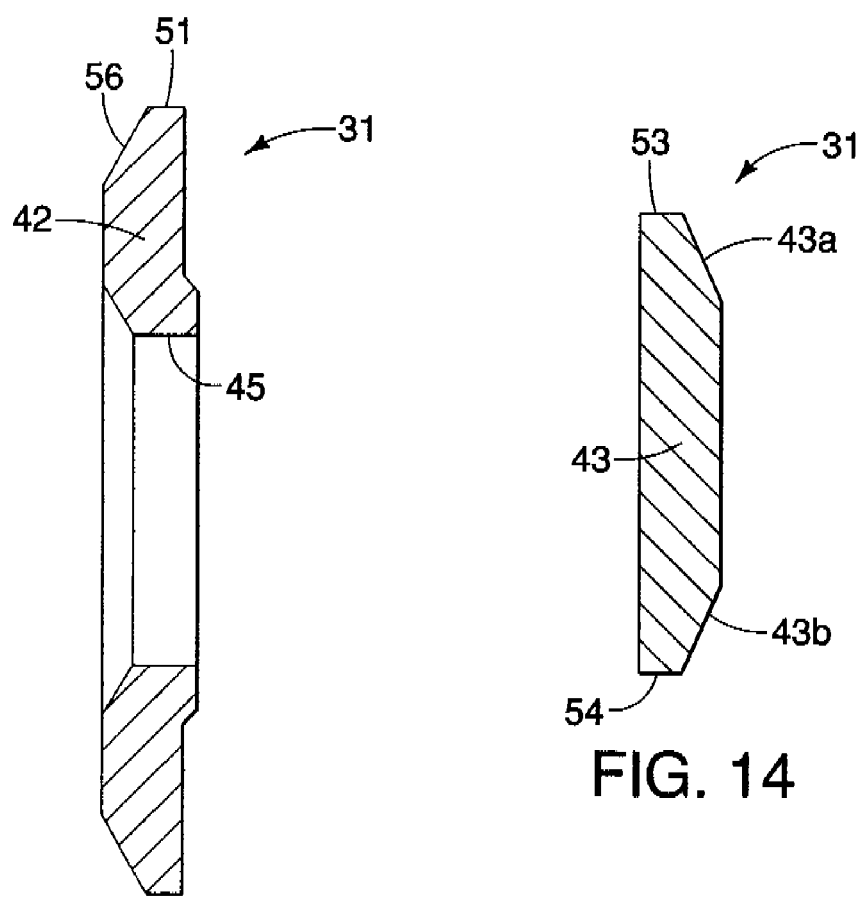

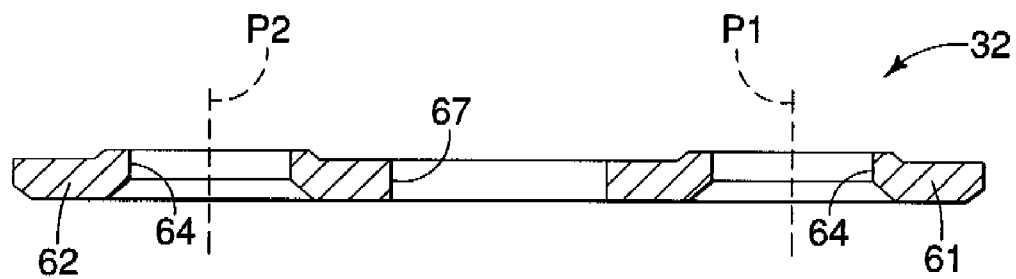
FIG. 21
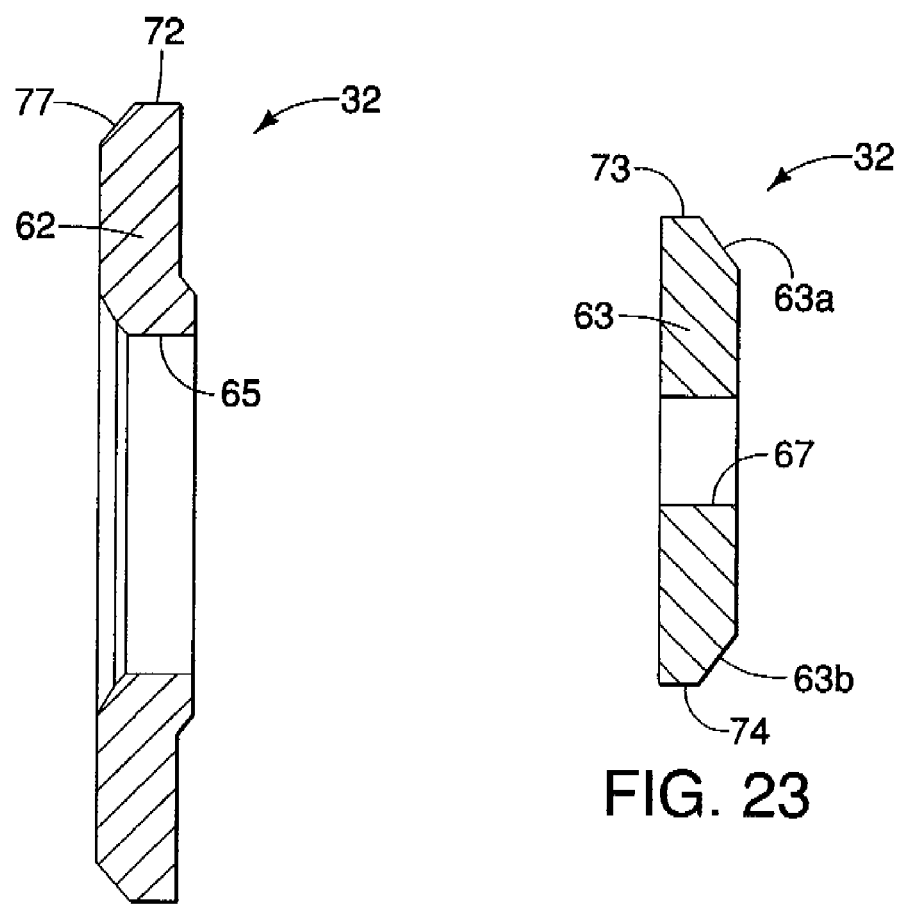
FIG. 22
FIG. 23

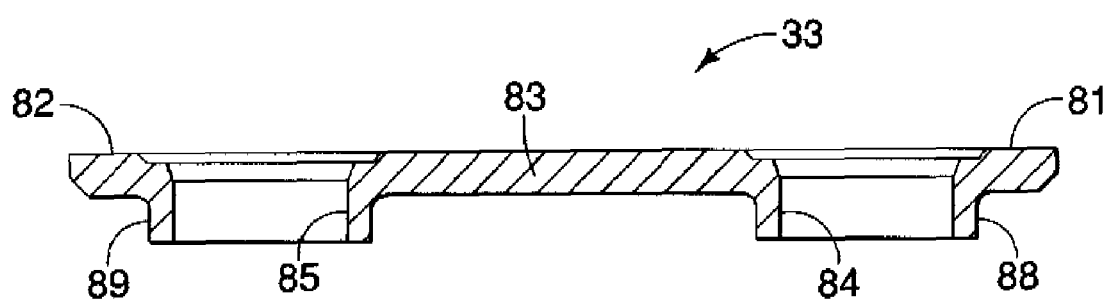
FIG. 30
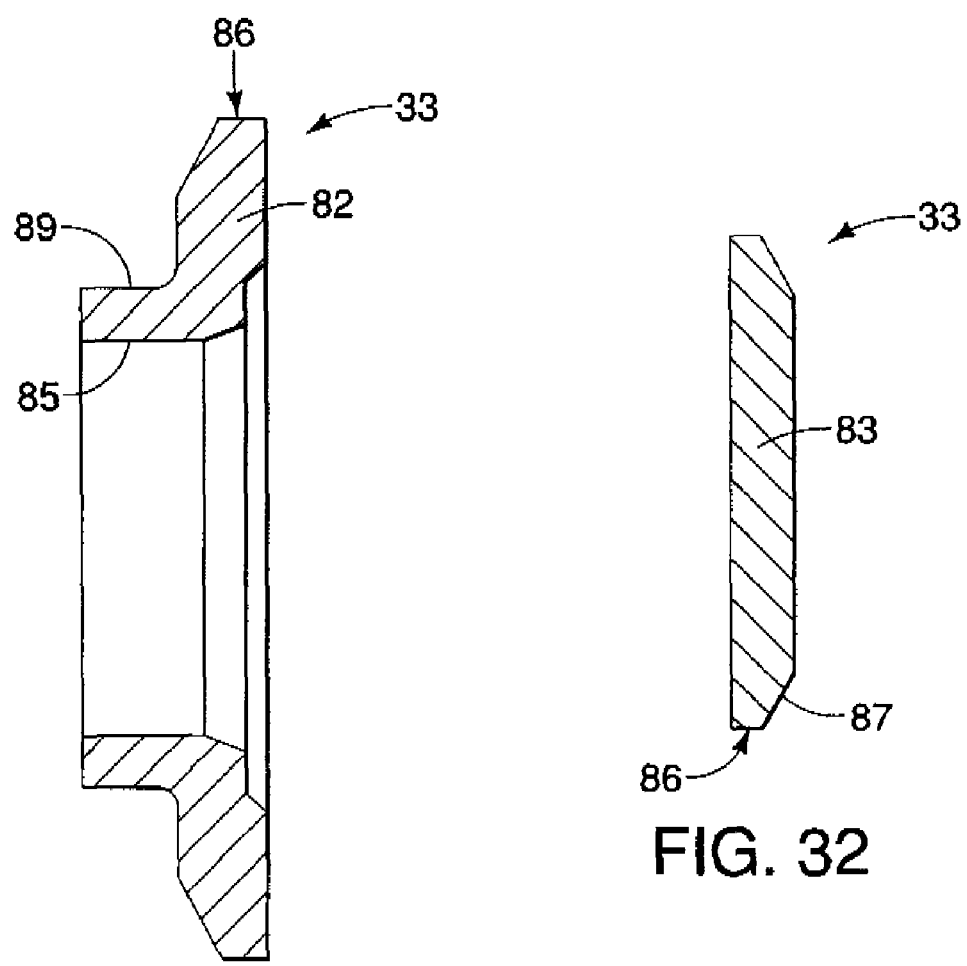
FIG. 31
FIG. 32

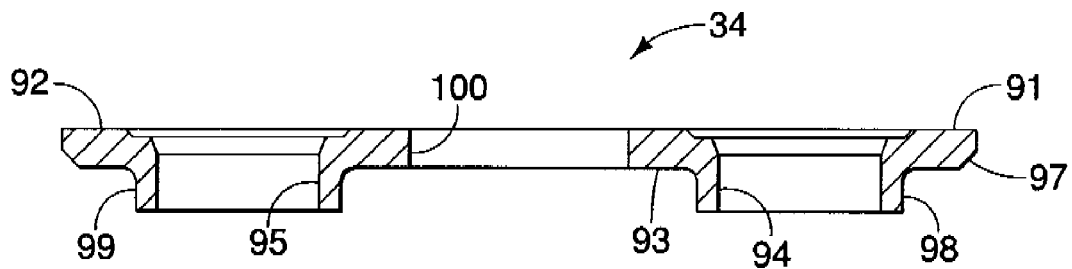
FIG. 39
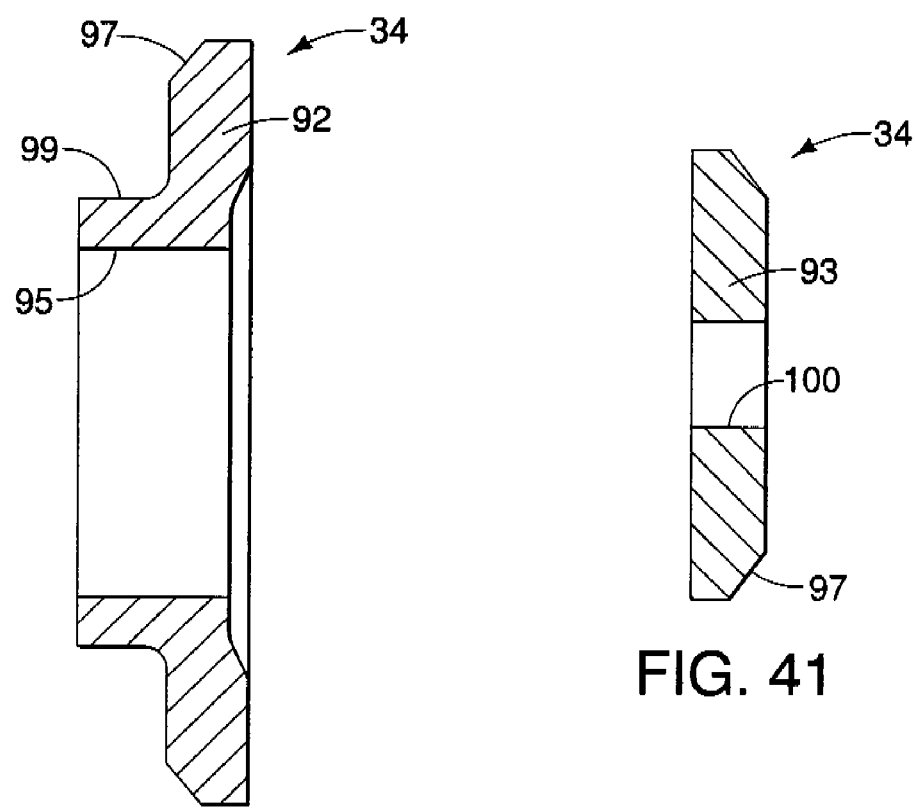
FIG. 40
FIG. 41

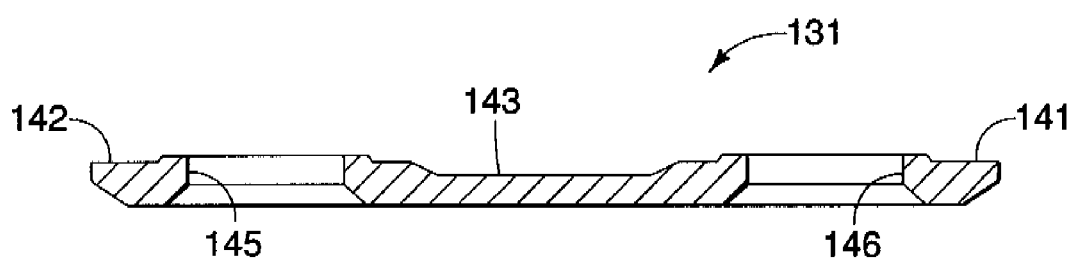
FIG. 48
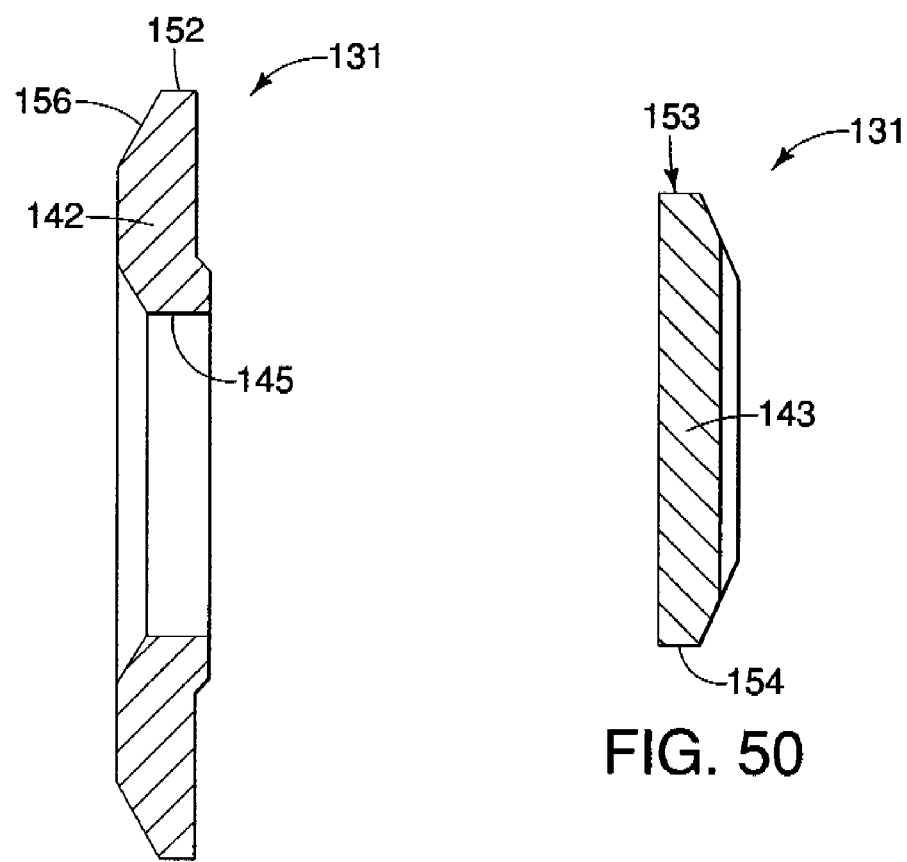
FIG. 50
FIG. 49

BICYCLE CHAIN

BACKGROUND OF THE INVENTION

1. Field of the Invention

This invention generally relates to bicycle chains. More specifically, the present invention relates to link configurations of a bicycle chain to aid in shifting.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is the bicycle chain.

Most bicycles have a drive train that uses a chain to transmit the pedaling action from the rider to the rear wheel. Bicycle chains have a plurality of inner links and a plurality of outer links that are interconnected in an alternating manner by a plurality of pins. Typically, each of the inner links includes a pair of parallel inner plates connected by a pair of parallel hollow cylinders or pins surrounded by cylindrical rollers. Each of the outer pin links includes a pair of parallel outer plates connected by the pins of the adjacent inner links. In order to form a single continuous chain, two of the inner links are connected together by a releasable connecting link, which is often called a master chain link. Examples of bicycle chains with a master link are disclosed in U.S. Pat. No. 5,362,282 to Lickton, U.S. Pat. No. 6,110,064 to Guichard, and U.S. Patent Publication No. 2002/0173395A1 to Reiter et al. Other examples of bicycle chains are disclosed in U.S. Pat. No. 4,265,134 to Dupoyet, U.S. Pat. No. 4,596,539 to Yamasaki, U.S. Pat. No. 5,226,857 to Ono et al., U.S. Pat. No. 5,741,196 to Campagnolo and U.S. Patent Publication No. 2005/0020394A1 to Valle.

When downshifting a chain from a large front chain ring to a smaller chain ring, the outer links of the chain sometime tend to contact the interiorly facing surface of the large front chain ring. Thus, some bicycle cranksets have been provided with downshifting recesses or indentations on the interiorly facing surface of the large front chain ring to aid in the downshifting from. While this arrangement works well. The manufacturing process for forming such a bicycle crankset requires additional manufacturing steps that can increase the cost of manufacturing the bicycle crankset. Also since these downshifting recesses or indentations are located adjacent the teeth, these downshifting recesses or indentations can also weaken the chain ring.

While these above-mentioned chains work well, it will be apparent to those skilled in the art from this disclosure that there exists a continual need for an outer chain link. This invention addresses this need in the art as well as other needs, which will become apparent to those skilled in the art from this disclosure.

SUMMARY OF THE INVENTION

One object of the present invention is to provide a chain that can be used with a bicycle crankset having a large front chain ring that has no downshifting recesses or indentations are located adjacent the teeth or at least a shallower downshifting recesses or indentations as compared to prior bicycle crankset.

Another of the present invention is to provide a chain that improves chain stability on the large front chain ring of the front sprocket set without a need to modify the rear sprocket set.

The foregoing objects can basically be attained by providing a bicycle chain comprising a first outer link plate, a second outer link plate, a first inner link plate, a second inner link plate and a first link pin. The first outer link plate includes a first end portion with a first pin coupling opening, a second end portion with a second pin coupling opening, and a first connecting portion interconnecting the first and second end portions of the first outer link plate, with the first and second end portions and the first connecting portion of the first outer link plate defining a first outer link peripheral edge and the first outer link plate including an exteriorly facing surface with a first chamfered outer edge portion extending along a section of the first outer link peripheral edge of the first end portion and a first reduced area part having a reduced radial dimension with respect to a radial dimension of a portion lying along a longitudinal axis of the first outer link plate, with the radial dimensions being measured radially from an edge of the first pin coupling opening in the first outer link plate to the first outer link peripheral edge along a line that extends from a first pivot axis of the first pin coupling opening in the first outer link plate. The second outer link plate includes a first end portion with a first pin coupling opening, a second end portion with a second pin coupling opening and a second connecting portion interconnecting the first and second end portions of the second outer link plate. The first and second end portions and the second connecting portion of the second outer link plate define a second outer link peripheral edge with the first and second outer link peripheral edges of the first and second outer link plates being shaped differently. The first inner link plate includes a first end portion with a first pin coupling opening, a second end portion with a second pin coupling opening and a first connecting portion interconnecting the first and second end portions of the first inner link plate. The second inner link plate includes a first end portion with a first pin coupling opening, a second end portion with a second pin coupling opening and a second connecting portion interconnecting the first and second end portions of the second inner link plate. The first connecting portion of the first inner link plate has a minimum width that is wider than a minimum width of the second connecting portion of the second inner link plate. The first link pin connects the first end portions of the first and second outer link plates to the second end portions of the first and second inner link plates.

These and other objects, features, aspects and advantages of the present invention will become apparent to those skilled in the art from the following detailed descriptions, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 12 is a longitudinal cross sectional view of the first or outside outer link plate illustrated in FIGS. 7 to 11 as seen along section line 12-12 of FIG. 9 in accordance with the first embodiment of the present invention;

FIG. 13 is a transverse cross sectional view of the second end portion of the first or outside outer link plate illustrated in FIGS. 7 to 11 as seen along section line 13-13 of FIG. 9 in accordance with the first embodiment of the present invention;

FIG. 14 is a transverse cross sectional view of the connecting portion of the first or outside outer link plate illustrated in FIGS. 7 to 11 as seen along section line 14-14 of FIG. 9 in accordance with the first embodiment of the present invention;

FIG. 21 is a longitudinal cross sectional view of the second or inside outer link plate illustrated in FIGS. 16 to 20 as seen along section line 21-21 of FIG. 18 in accordance with the first embodiment of the present invention;

FIG. 22 is a transverse cross sectional view of the second end portion of the second or inside outer link plate illustrated in FIGS. 16 to 20 as seen along section line 22-22 of FIG. 18 in accordance with the first embodiment of the present invention;

FIG. 23 is a transverse cross sectional view of the connecting portion of the second or inside outer link plate illustrated in FIGS. 16 to 20 as seen along section line 23-23 of FIG. 18 in accordance with the first embodiment of the present invention;

FIG. 30 is a longitudinal cross sectional view of the first or outside inner link plate illustrated in FIGS. 25 to 29 as seen along section line 30-30 of FIG. 27 in accordance with the first embodiment of the present invention;

FIG. 31 is a transverse cross sectional view of the second end portion of the first or outside inner link plate illustrated in FIGS. 25 to 29 as seen along section line 31-31 of FIG. 27 in accordance with the first embodiment of the present invention;

FIG. 32 is a transverse cross sectional view of the connecting portion of the first or outside inner link plate illustrated in FIGS. 25 to 29 as seen along section line 32-32 of FIG. 27 in accordance with the first embodiment of the present invention;

FIG. 39 is a longitudinal cross sectional view of the second or inside inner link plate illustrated in FIGS. 34 to 38 as seen along section line 39-39 of FIG. 36 in accordance with the first embodiment of the present invention;

FIG. 40 is a transverse cross sectional view of the second end portion of the second or inside inner link plate illustrated in FIGS. 34 to 38 as seen along section line 40-40 of FIG. 36 in accordance with the first embodiment of the present invention;

FIG. 41 is a transverse cross sectional view of the connecting portion of the second or inside inner link plate illustrated in FIGS. 34 to 38 as seen along section line 41-41 of FIG. 36 in accordance with the first embodiment of the present invention;

FIG. 48 is a longitudinal cross sectional view of the first or outside outer link plate illustrated in FIGS. 43 to 47 as seen along section line 48-48 of FIG. 45 in accordance with the second embodiment of the present invention;

FIG. 49 is a transverse cross sectional view of the second end portion of the first or outside outer link plate illustrated in FIGS. 43 to 47 as seen along section line 49-49 of FIG. 45 in accordance with the second embodiment of the present invention;

FIG. 50 is a transverse cross sectional view of the connecting portion of the first or outside outer link plate illustrated in FIGS. 43 to 47 as seen along section line 50-50 of FIG. 46 in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
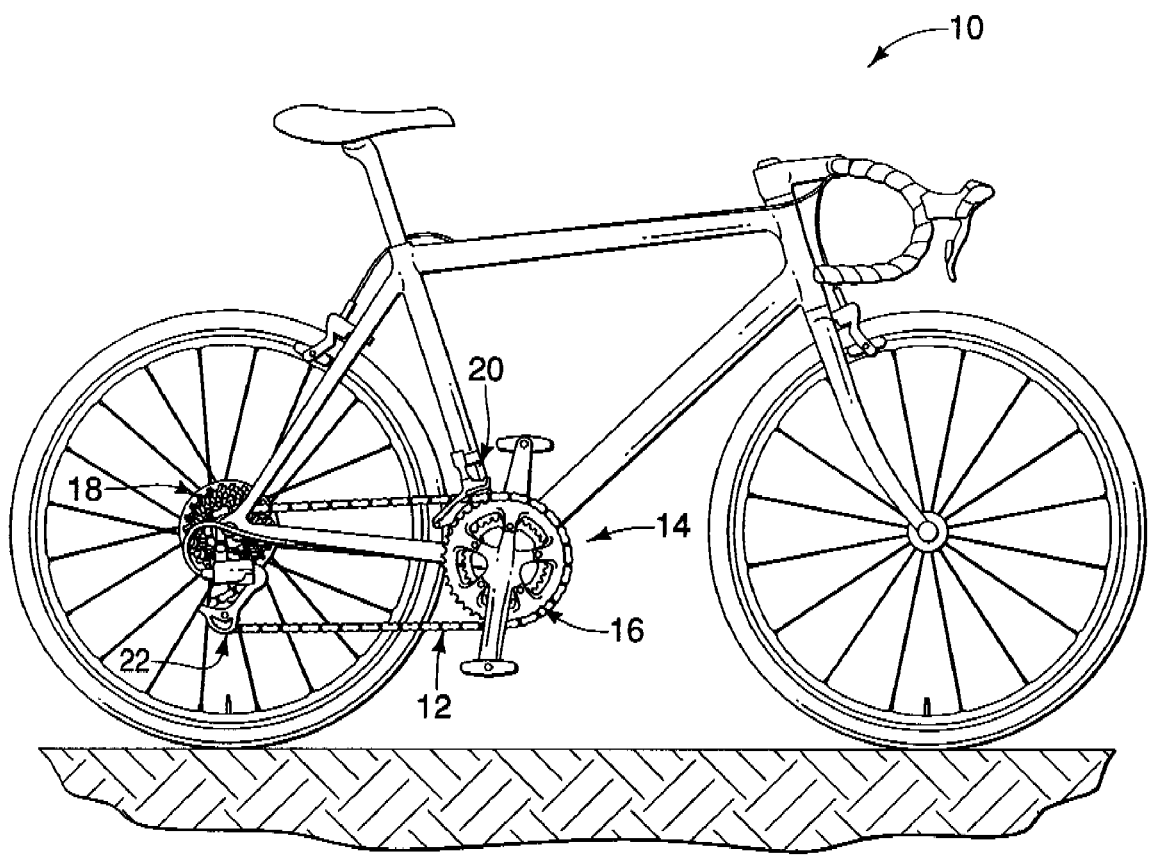
FIG. 1 is a side elevational view of a bicycle having a drive train that uses a bicycle chain in accordance with one embodiment of the present invention.

Referring initially to FIG. 1, a bicycle 10 is illustrated that uses a bicycle chain 12 in accordance with a first embodiment of the present invention. The bicycle 10 includes, among other things, a drive train 14 that is configured to convert the rider's pedaling force into driving force. The chain 12 is part of the drive train 14. The drive train 14 also includes a front crankset 16, a rear sprocket assembly 18, a front derailleur 20 and a rear derailleur 22. The front crankset 16 is mounted on a bottom bracket that is secured in a hanger on the bicycle frame in a conventional manner. The rear sprocket assembly 18 is mounted to a free wheel of the rear wheel in a conventional manner. The chain 12 is arranged on the front crankset 16 and the rear sprocket set or assembly 18 so as to extend therebetween in a conventional manner. The derailleurs 20 and 22 are configured and arranged to change gears by shifting the chain 12 in a lateral direction of the bicycle 10 in a conventional manner.

Figure 2:
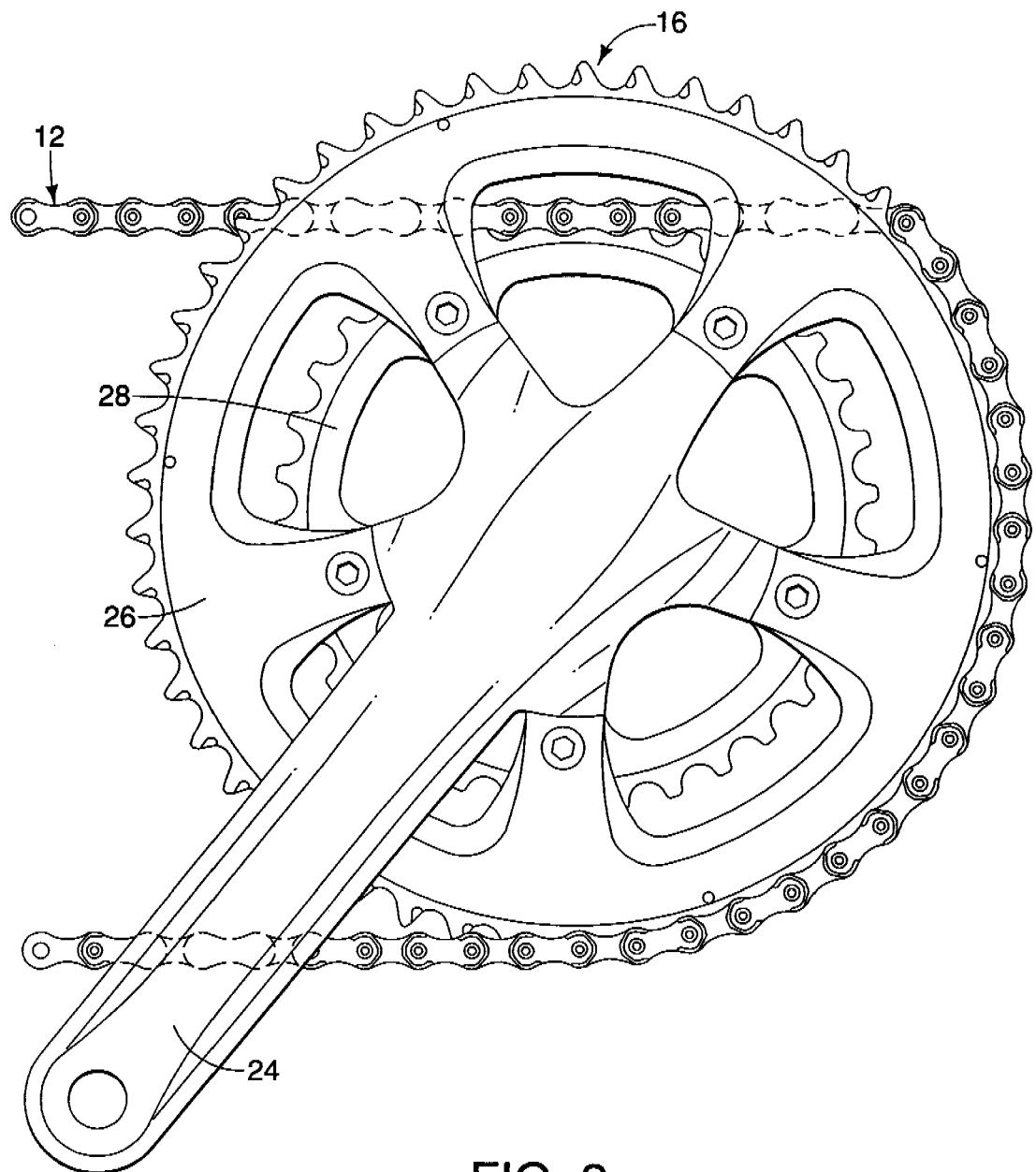
FIG. 2 is an enlarged side elevational view of a front bicycle crankset in which the bicycle chain is being down shifted from the large outer chain ring to the smaller inner chain ring in accordance with one embodiment of the present invention.

Referring now to FIG. 2, the right side of the front crankset 16 will be briefly described. The right side of the front crankset 16 basically includes a right crank arm (gear crank) 24 with an outer chain ring 26 and an inner chain ring 28. The front crankset 16 can be any known construction, and thus, will not be discussed and/or illustrated in detail herein. However, as explained below, the chain 12 of the present invention allows the outer chain ring 26 to be configured without deep downshifting recesses or indentions, and more preferably, to be configured without any downshifting recesses or indentions as shown.

Figure 3:
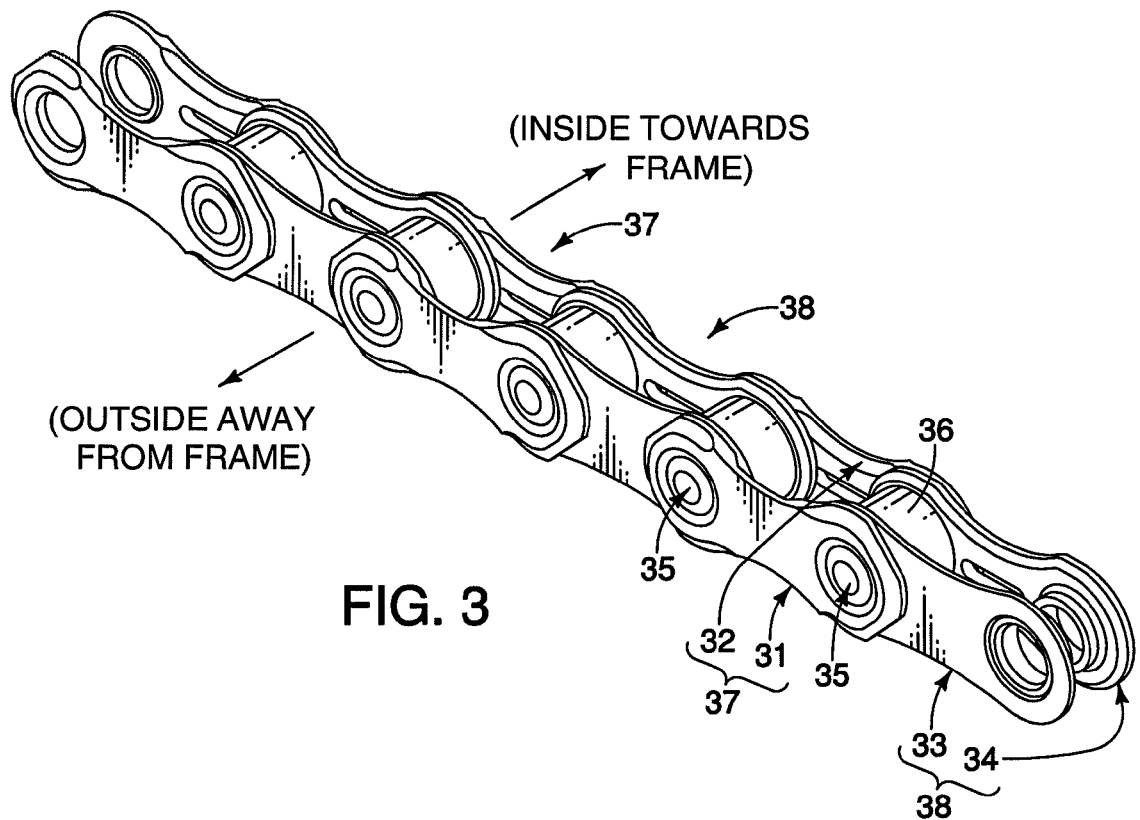
FIG. 3 is a perspective view of the bicycle chain equipped with a plurality of the outer chain links and a plurality of the inner chain links in accordance with the present invention.
Figure 4:
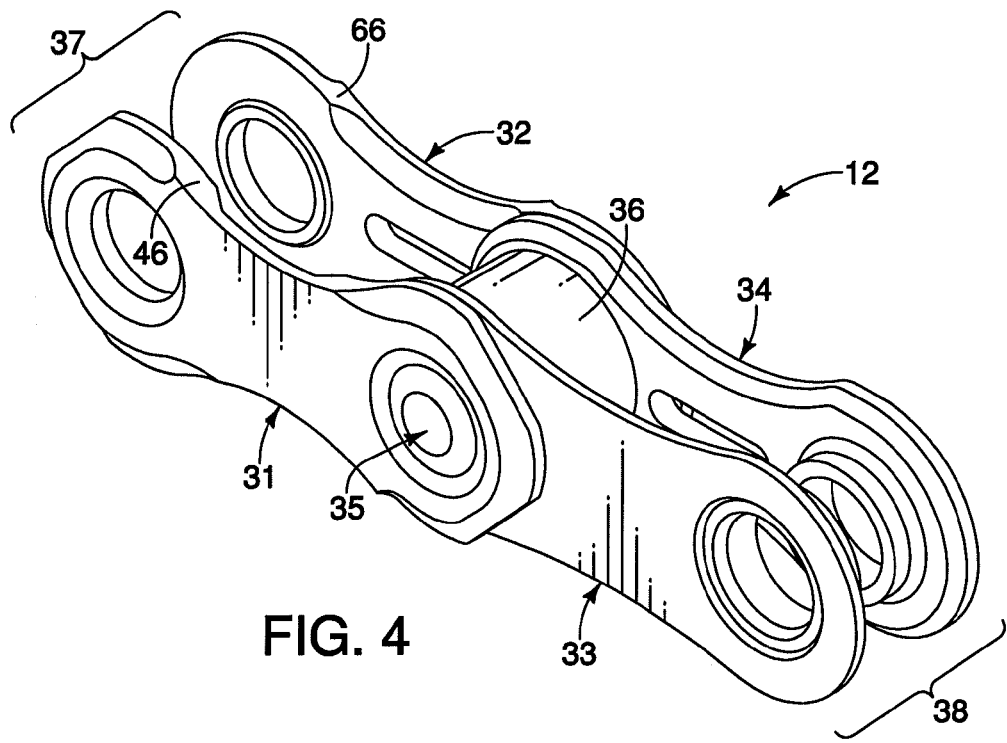
FIG. 4 is an enlarged perspective view of a portion of the bicycle chain illustrated in FIG. 3 in accordance with the first embodiment of the present invention.

Referring now to FIGS. 3 and 4, the chain 12 basically includes a plurality of first (outside) outer link plates 31, a plurality of second (inside) outer link plates 32, a plurality of first (outside) inner link plates 33, a plurality of second (inside) inner link plates 34, a plurality of pins or rivets 35 and a plurality of rollers 36. Each opposed pair of the outer link plates 31 and 32 forms an outer link 37. Each opposed pair of the inner link plates 33 and 34 forms an inner link 38.

The inner links 38 are interconnected in an alternating manner with the outer links 37 by the link pins 35 in a conventional manner. A master chain link (not shown) preferably interconnects two pairs of the inner 38 together so as to form a single continuous loop. The link plates 31 to 34, the link pins 35 and the rollers 36 are metal parts that are well known in the bicycle chain field. Thus, the link pins 35 and the rollers 36 are well known structures, and thus, they will not be discussed and/or illustrated in detail herein. Moreover, these parts can vary as needed and/or desired. For example, while the link pins 35 are illustrated as solid cylinders with a recess at each end so that the pins can be easily deformed that are deformed at each end, the link pins 35 can be hollow pins if needed and/or desired.

Referring now to FIGS. 4 to 15, the first (outside) outer link plates 31 will now be discussed in greater detail. When one of the first outer link plates 31 is coupled to one of the second outer link plates 32 by a pair of the link pins 35, the outer chain link 37 is formed. First, each of the first outer link plates 31 has been modified relative to a conventional outer link plate so that the first outer link plates 31 minimize contact with the outer chain ring 26 during a downshifting operation.

Figure 8:
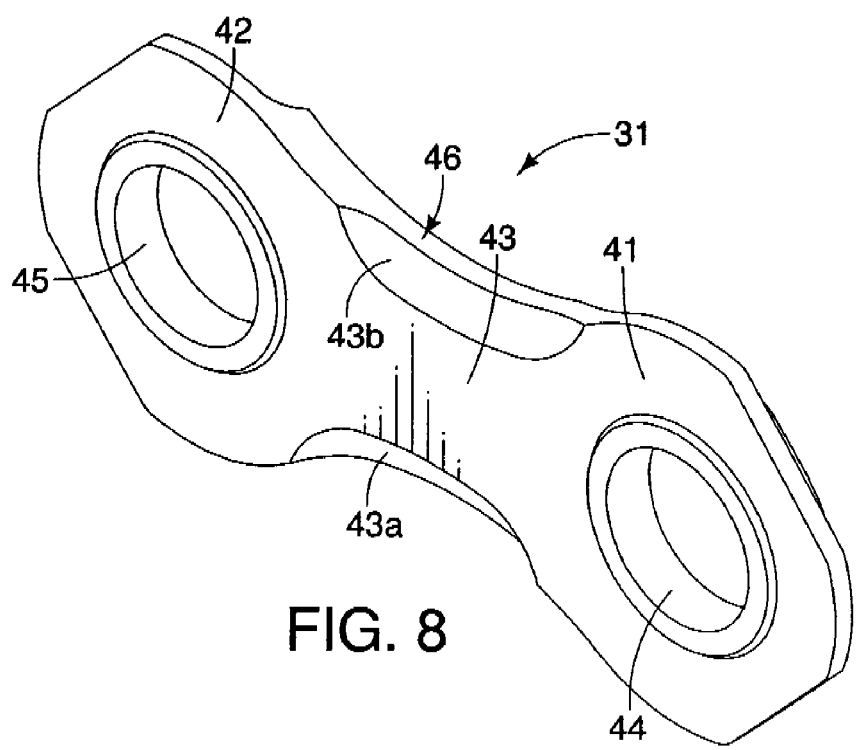
FIG. 8 is an inside perspective view of the first or outside outer link plate illustrated in FIG. 7 in accordance with the first embodiment of the present invention.
Figure 9:
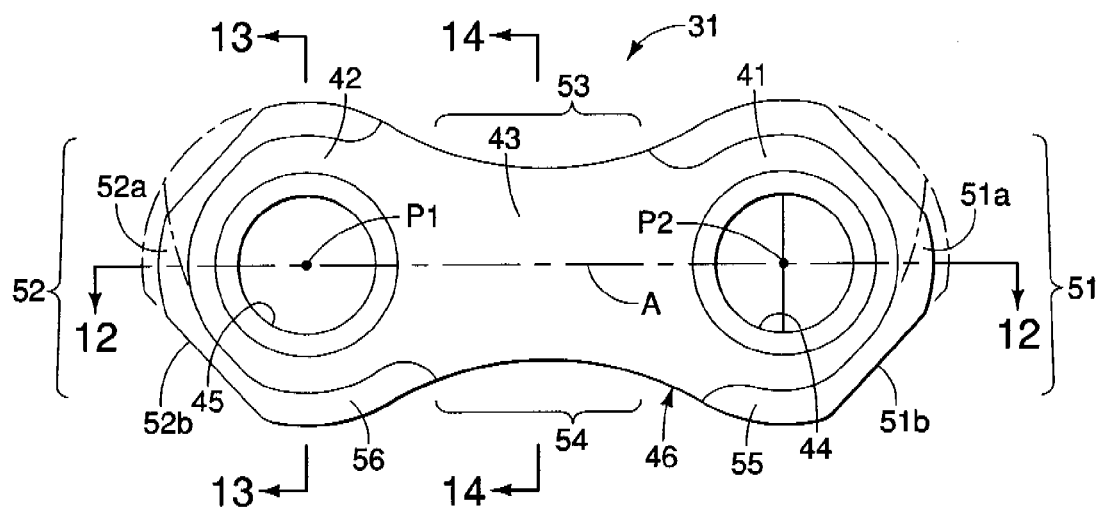
FIG. 9 is an outside elevational view of the first or outside outer link plate illustrated in FIGS. 7 and 8 in accordance with the first embodiment of the present invention.
Figure 10:
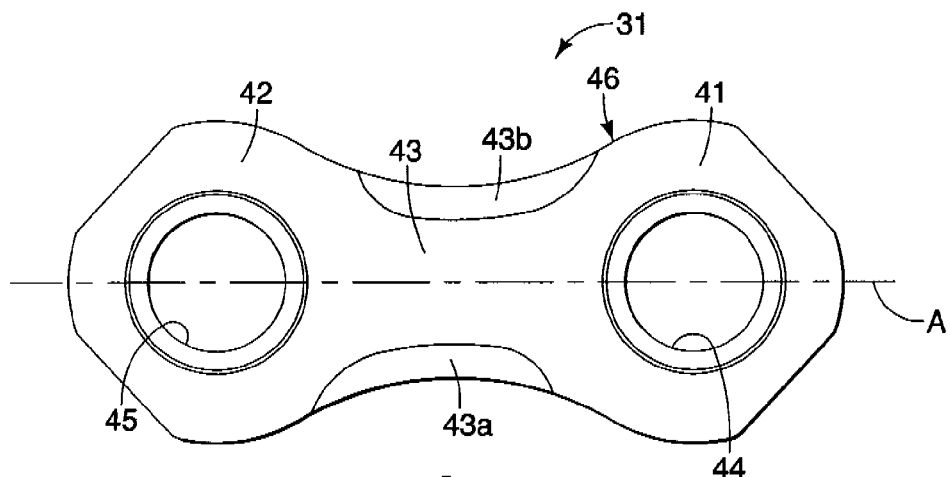
FIG. 10 is an inside elevational view of the first or outside outer link plate illustrated in FIGS. 7 to 9 in accordance with the first embodiment of the present invention.
Figure 11:
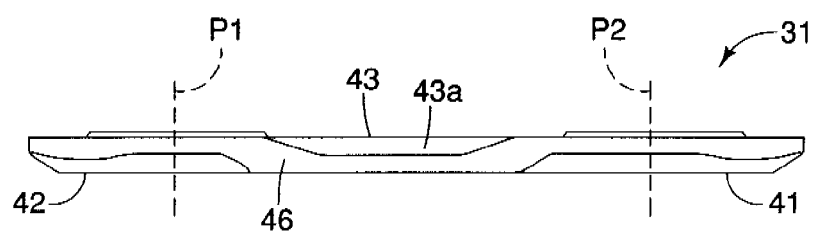
FIG. 11 is a top edge view of the first or outside outer link plate illustrated in FIGS. 7 to 10 in accordance with the first embodiment of the present invention.

Now referring now to FIGS. 8 and 10, each of the first outer link plates 31 includes a first end portion 41, a second end portion 42 and a connecting portion 43 interconnecting the first and second end portions 41 and 42. The portions 41 to 43 of each of the first outer link plates 31 are preferably formed as a one-piece, unitary member from a hard, rigid material such as a metallic material that is known to be used for manufacturing bicycle chains. Also the first end portion 41 also has a pin coupling opening 44 for receiving one of the link pins 35 therein. Likewise, the second end portion 42 also has a pin coupling opening 45 for receiving one of the link pins 35 therein. The ends of the link pins 35 are deformed for fixedly securing the first and second outer link plates 31 and 32 thereto. The pin coupling openings 44 and 45 have center points that define first and second pivot axes P1 and P2 as seen in FIGS. 9 and 11. A longitudinal axis A of the first and second outer link plates 31 and 32 bisects the connecting portion 43 and the pin coupling openings 44 and 45, i.e., passes through the pivot axes P1 and P2 of the pin coupling openings 44 and 45. While the pin coupling openings 44 and 45 are illustrated as two separate and distinct pin coupling openings constituting a first coupling hole and a second coupling hole, it will be apparent to those skilled in the art from this disclosure that a single elongated slot could extend between the pin coupling openings 44 and 45. Thus, the term "coupling opening" should not be limited to a continuous circular hole that extends 360 degrees.

Figure 15:
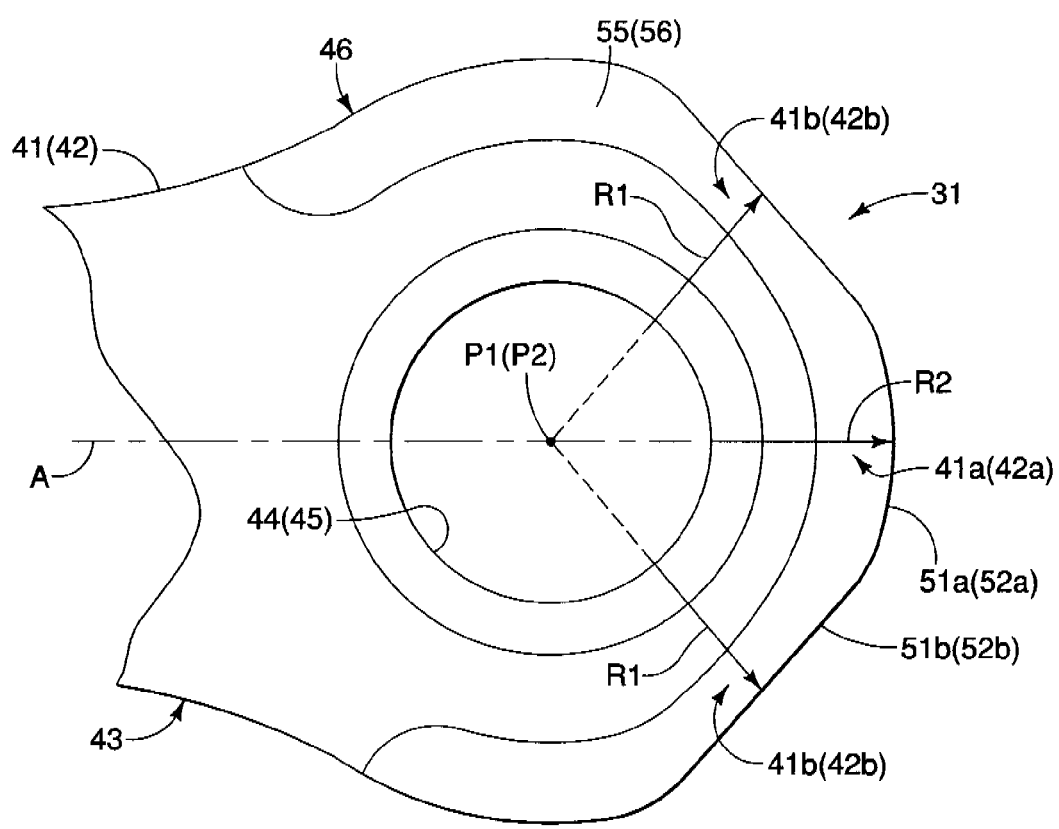
FIG. 15 is an enlarged elevational view of an end portion of the first or outside outer link plate illustrated in FIGS. 7 to 11 in accordance with the first embodiment of the present invention.
Figure 16:
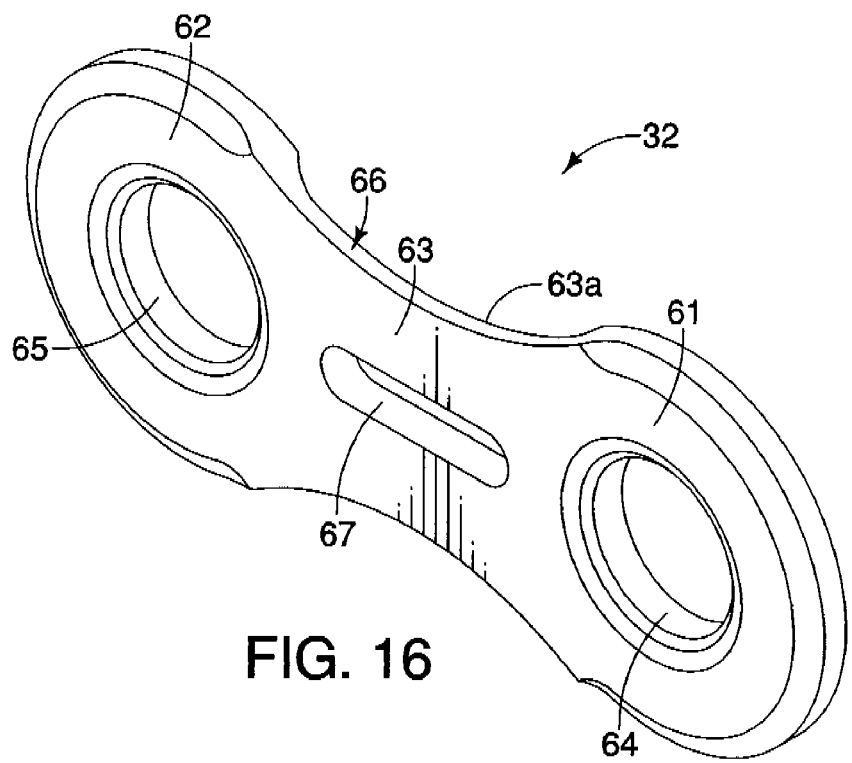
FIG. 16 is an outside perspective view of one of the second or inside outer link plates illustrated in FIGS. 3 and 4 in accordance with the first embodiment of the present invention.
Figure 17:
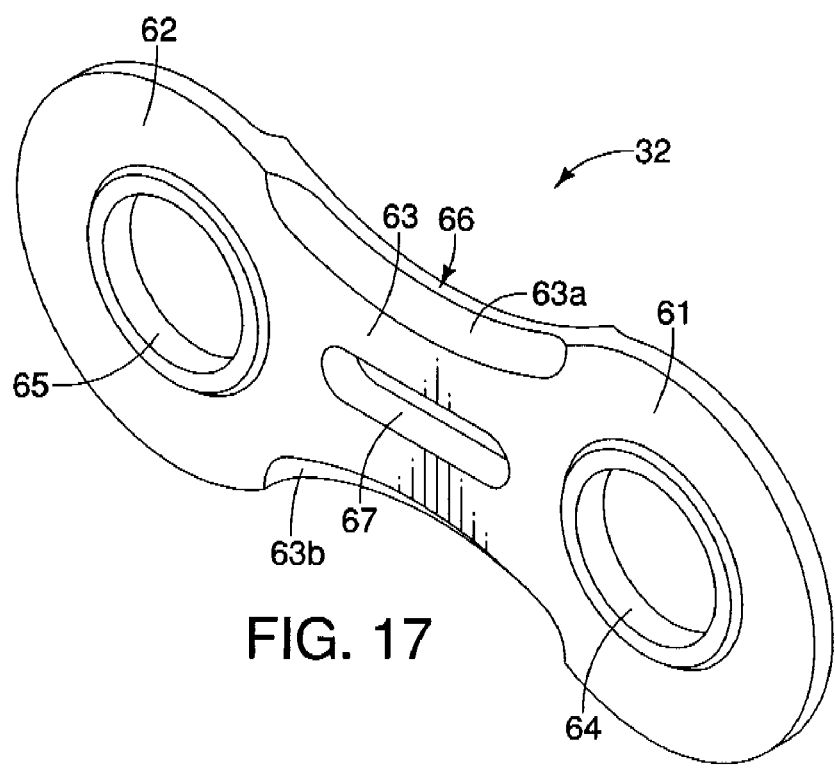
FIG. 17 is an inside perspective view of the second or inside outer link plate illustrated in FIG. 16 in accordance with the first embodiment of the present invention.

Referring now to FIGS. 9 and 15, the first and second end portions 41 and 42 and the connecting portion 43 of the first outer link plate 31 define a first outer link peripheral edge 46 located between opposite side surfaces of the first outer link plate 31. Thus, the first outer link plate 31 has an exteriorly facing surface that faces away from the second outer link plate 32 and an interiorly facing surface that faces towards the second outer link plate 32. In other words, the term "exteriorly facing" as used herein refers to a direction relative to the chain 12 and not the bicycle 10. The portions 41, 42 and 43 of the first outer link plate 31 generally have the same minimum thickness between the exteriorly and interiorly facing surfaces, excluding the first chamfered outer edge portion.

The interiorly facing surface of the first connecting portion 43 is provided with an upper chamfered outer edge portion 43a formed extending along an upper edge section of the first outer link peripheral edge 46, and a lower chamfered outer edge portion 43b extending along a lower edge section of the first outer link peripheral edge 46. The upper and lower chamfered outer edge portions 43a and 43b are asymmetrical about a transverse plane bisecting the first outer link plate 31 and perpendicular to the longitudinal axis A of the first outer link plate 31. In other words, the upper chamfered outer edge portion 43a is offset towards the second end portion 42 relative to the longitudinal center point of the first outer link plate 31, while the lower chamfered outer edge portion 43b is offset towards the first end portion 41 relative to the longitudinal center point of the first outer link plate 31. These upper and lower chamfered outer edge portions 43a and 43b aid in shifting by minimizing interference with the sprocket teeth. Optionally, annular tubular extensions are provided around the pin coupling openings 44 and 45. Thus, the interiorly facing surface of the first outer link plate 31 is a flat surface except for the upper and lower chamfered outer edge portions 43a and 43b and the annular tubular extensions that are provided around the pin coupling openings 44 and 45.

The first outer link peripheral edge 46 includes a first end edge section 51, a second end edge section 52 and a pair of central edge sections 53 and 54. The first end edge section 51 extends about the first end portion 41 of the first outer link plate 31. The second end edge section 52 extends about the second end portion 42 of the first outer link plate 31. The central edge sections 53 and 54 extend along the connecting portion 43 of the first outer link plate 31 between the first and second end portions 41 and 42 of the first outer link plate 31.

Figure 5:
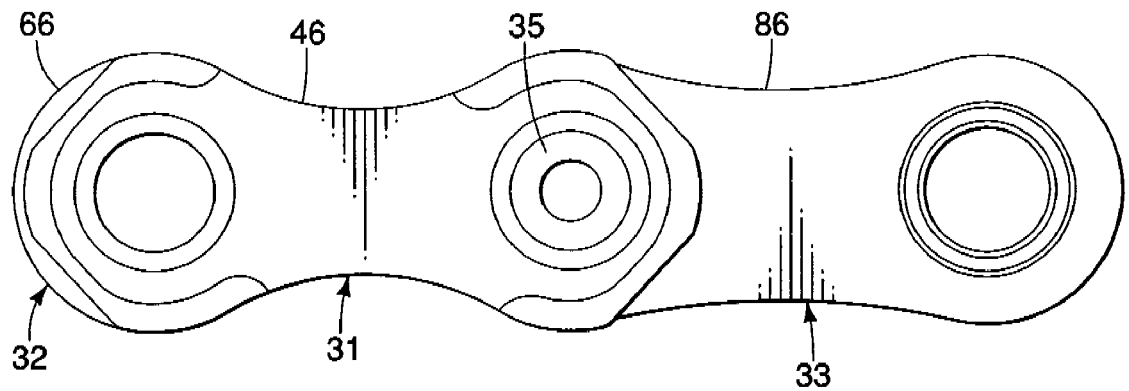
FIG. 5 is an outside elevational view of the portion of the bicycle chain illustrated in FIG. 4 in accordance with the first embodiment of the present invention.
Figure 6:
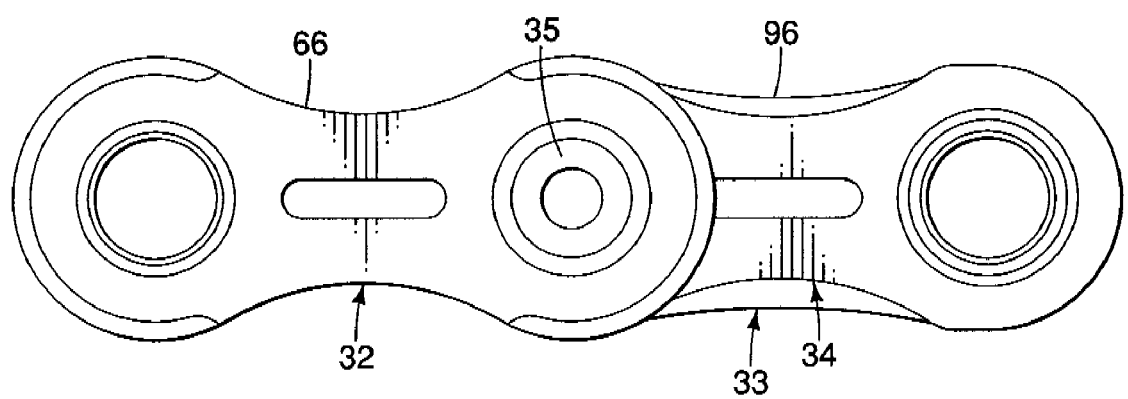
FIG. 6 is an inside elevational view of the portion of the bicycle chain illustrated in FIGS. 4 and 5 in accordance with the first embodiment of the present invention.
Figure 7:
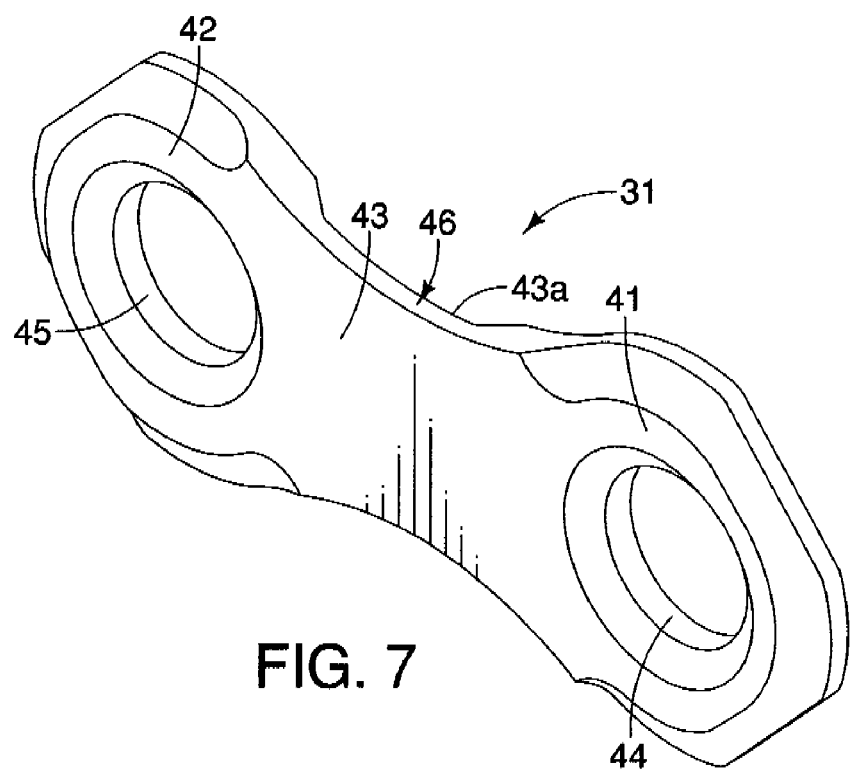
FIG. 7 is an outside perspective view of one of the first or outside outer link plates illustrated in FIGS. 3 to 5 in accordance with the first embodiment of the present invention.

As best seen in FIGS. 5, 6 and 9, the first and second end portions 41 and 42 are smaller than the corresponding parts of the second outer link plate 32. The configurations of the first and second end portions 41 and 42 of the first outer link plates 31 allow for a small clearance to occur between the teeth of the outer chain ring 26 and the first and second end portions 41 and 42 of the first outer link plates 31 to aid in the downshifting movement of the chain 12. In other words, the configurations of the first and second end portions 41 and 42 of the first outer link plates 31 minimizes interference with the teeth of the outer chain ring 26 during the downshifting movement of the chain 12. The first and second end portions 41 and 42 are asymmetrical about a plane perpendicularly bisecting the longitudinal axis A. The first and second end portions 41 and 42 are preferably inverted mirror images of each other so that the first outer link plate 31 look identical if flip 180°. In any event, since the first and second end portions 41 and 42 are basically identical to each other in the illustrated embodiment, only the first end portion 41 will be illustrated in detail in FIG. 15 with the reference numerals in parentheses indicating the corresponding parts of the second end portion 42.

As seen in FIG. 15, the first end portion 41 is provided with a first chamfered (beveled) outer edge portion 55 that extends along a majority of the first end edge section 51 of the first outer link peripheral edge 46, while the second end portion 42 is provided with a second chamfered (beveled) outer edge portion 56 that extends along a majority of the second end edge section 52 of the first outer link peripheral edge 46. Thus, the first chamfered outer edge portion 55 extends along the first end edge section 51 of the first outer link peripheral edge 46 and around the first pivot axis P1, while the second chamfered outer edge portion 56 extends along the second end edge section 52 of the first outer link peripheral edge 46 and around the second pivot axis P2. The chamfered outer edge portions 55 and 56 are asymmetrically arranged relative to the longitudinal axis A, with the top part of the chamfered outer edge portion 55 extending 150° from the longitudinal axis A about the pivot axis P1 of the first pin coupling opening 44 and the bottom part of the chamfered outer edge portion 55 extending 120° from the longitudinal axis A about the pivot axis P1 of the first pin coupling opening 44. In any cases, it is preferably that the chamfered outer edge portions 55 and 56 extend at least more than ninety degrees from in both directions as measured about the first pivot axis P1 of the first pin coupling opening 44. In other words, it is preferably, that the chamfered outer edge portions 55 and 56 extend at least 180° about their corresponding pivot axis P1 or P2. More preferably, the chamfered outer edge portions 55 and 56 extend between 240° and 270° about their corresponding pivot axis P1 or P2. In the illustrated embodiment, the chamfered outer edge portions 55 and 56 extend to 270 degrees about their corresponding one of the pivot axes P1 and P2. The chamfered outer edge portions 55 and 56 are dimensioned such that the portion of the chain 12 located between the outer chain ring 26 and the inner chain ring 28 minimizes interference with the inside face of the outer chain ring 26 and/or the adjacent tooth of the outer chain ring 26 during the downshifting movement of the chain 12.

As best seen in FIG. 15, the first and second end edge sections 51 and 52 of the first outer link peripheral edge 46 of the first and second end portions 41 and 42 are non-semicircular about the longitudinal axis A. The first end edge section 51 of the first outer link peripheral edge 46 includes a middle part 51a located at the longitudinal axis A and a pair of flat parts 51b extending from the middle edge part 51a. Likewise, the second end edge section 52 of the first outer link peripheral edge 46 includes a middle part 52a located at the longitudinal axis A and a pair of flat parts 52b extending from the middle edge part 52a. The middle edge parts 51a and 52a are preferably curved surfaces with their centers offset towards the middle of the first outer link plate 31 from their corresponding one of the pivot axes P1 and P2. The flat edge parts 51b are angled at ninety-five degrees (i.e., substantially ninety degrees) apart relative to each other about the longitudinal axis A. Likewise, the flat edge parts 52b are angled at ninety-five degrees (i.e., substantially ninety degrees) apart relative to each other about the longitudinal axis A. Thus, the first end portion 41 has a large area part 41a defined by the middle edge part 51a of the first outer link peripheral edge 46 located at the longitudinal axis A and a pair of reduced area parts 41b defined by the flat edge parts 51b of the first outer link peripheral edge 46. Similarly, the second end portion 42 has a large area part 42a defined by the middle edge part 52a of the first outer link peripheral edge 46 located at the longitudinal axis A and a pair of reduced area parts 42b defined by the flat edge parts 52b of the first outer link peripheral edge 46. In particular, the reduced area parts 41b and 42b have reduced radial dimension R1 with respect to radial dimensions R2 of the middle edge parts 51a and 52a (i.e., the portions of the first and second end portions 41 and 42 that lie along the longitudinal axis A. These radial dimensions R1 and R2 are measured radially from an edge of their corresponding one of the pin coupling openings 44 and 45 to the outer link peripheral edge 46 along a line that extends from a corresponding one of the first and second pivot axes P1 and P2.

While the first outer link peripheral edges 46 of the first outer link plates 31 are illustrated as being symmetrical about the longitudinal axis A, the first outer link peripheral edges 46 of the first outer link plates 31 can be configured such that the reduced area part and the chamfered outer edge portion are only disposed along a bottom area of the first outer link peripheral edges 46 that face a center axis of the outer chain ring 26 when in use. In particular, as shown in FIG. 9, dash-dot-dash broken lines illustrate an alternative configuration for the first outer link peripheral edges 46 of the first outer link plates 31. In this alternative configuration shown by the dash-dot-dash broken lines, basically two changes are made. First, the chamfered outer edge portions 55 and 56 have been shortened along the upper part of the end portions 41 and 42. Second, the upper ones of the flat edge parts 52b of the first outer link peripheral edge 46 have been eliminated and made curved. By just providing the lower ones of the flat edge parts 52b of the first outer link peripheral edge 46 and the lower sections of the chamfered outer edge portions 55 and 56, this will still minimize interference with the inside face of the outer chain ring 26 and/or the adjacent tooth of the outer chain ring 26 during the downshifting movement of the chain 12.

As best seen in FIGS. 4 to 6, the first and second end portions 41 and 42 are smaller than the corresponding parts of the second outer link plate 32. The configurations of the first and second end portions 41 and 42 of the first outer link plates 31 allow for a small clearance to occur between the teeth of the outer chain ring 26 and the first and second end portions 41 and 42 of the first outer link plates 31 to aid in the downshifting movement of the chain 12. In other words, the configurations of the first and second end portions 41 and 42 of the first outer link plates 31 minimizes interference with the teeth of the outer chain ring 26 during the downshifting movement of the chain 12.

Referring now to FIGS. 16 to 24, the second (inside) outer link plates 32 will now be discussed in greater detail. Similar to the first outer link plates 31, each of the second outer link plates 32 includes a first end portion 61, a second end portion 62 and a connecting portion 63 interconnecting the first and second end portions 61 and 62. The first and second end portions 61 and 62 are larger than the first and second end portions 41 and 42 of the first outer link plate 31. Thus, the first and second end portions 61 and 62 and the connecting portion 63 of the second outer link plate 32 defining a second outer link peripheral edge 66 such that the first and second outer link peripheral edges 46 and 66 of the first and second outer link plates 31 and 32 are shaped differently.

The portions 61 to 63 of each of the second outer link plates 32 are preferably formed as a one-piece, unitary member from a hard, rigid material such as a metallic material that is known to be used for manufacturing bicycle chains. Also the first end portion 61 also has a first pin coupling opening 64 for receiving one of the link pins 35 therein. Likewise, the second end portion 62 also has a pin coupling opening 65 for receiving one of the link pins 35 therein. The ends of the link pins 35 are deformed for fixedly securing the first and second outer link plates 31 and 32 thereto. In other words, a first one of the link pins 35 connects the first end portions 41 and 61 of the first and second link plates 31 and 32 together, and a second one of the link pins 35 connects the second end portions 42 and 62 of the first and second link plates 31 and 32 together.

Figure 18:
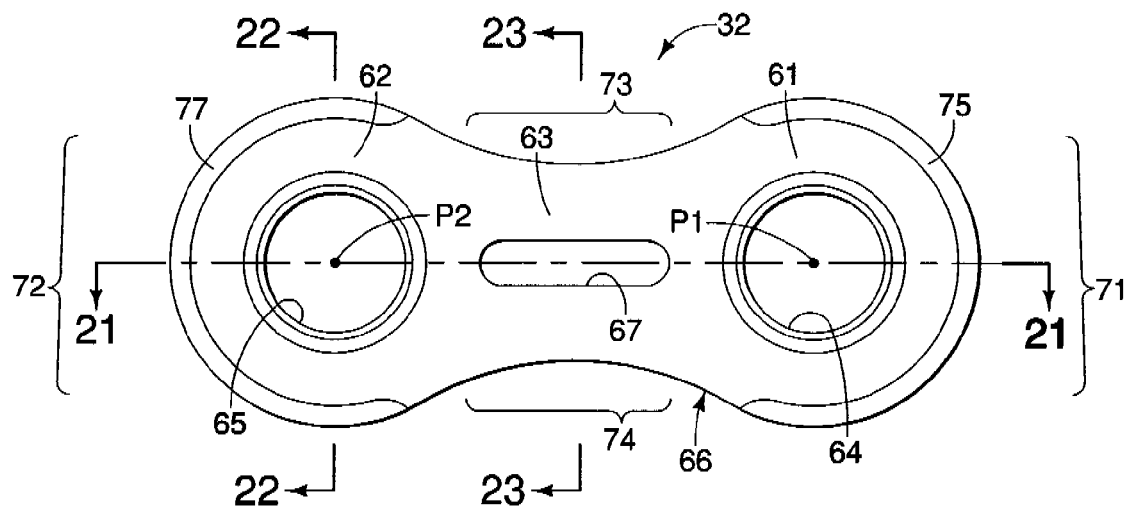
FIG. 18 is an outside elevational view of the second or inside outer link plate illustrated in FIGS. 16 and 17 in accordance with the first embodiment of the present invention.
Figure 19:
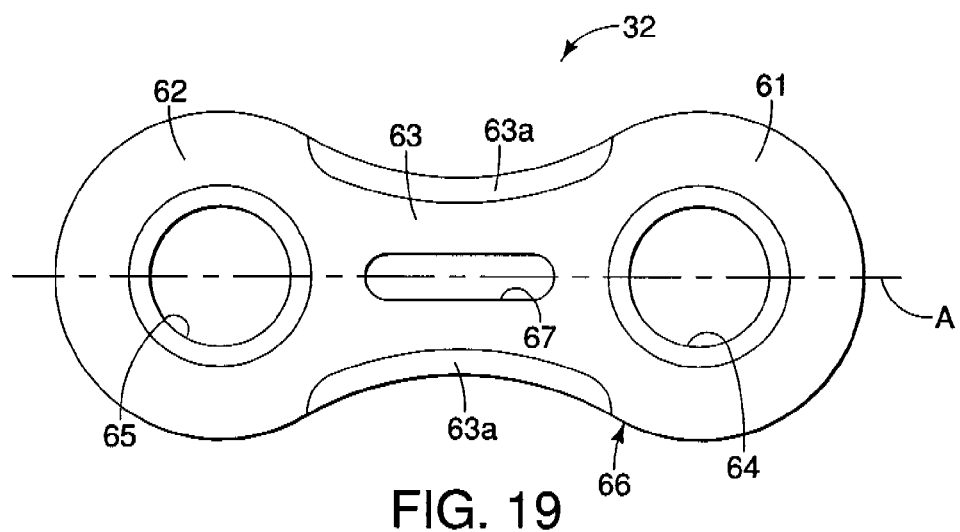
FIG. 19 is an inside elevational view of the second or inside outer link plate illustrated in FIGS. 16 to 18 in accordance with the first embodiment of the present invention.
Figure 20:
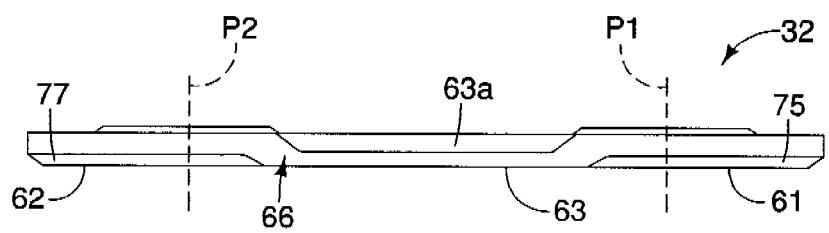
FIG. 20 is a bottom edge view of the second or inside outer link plate illustrated in FIGS. 16 to 19 in accordance with the first embodiment of the present invention.
Figure 24:
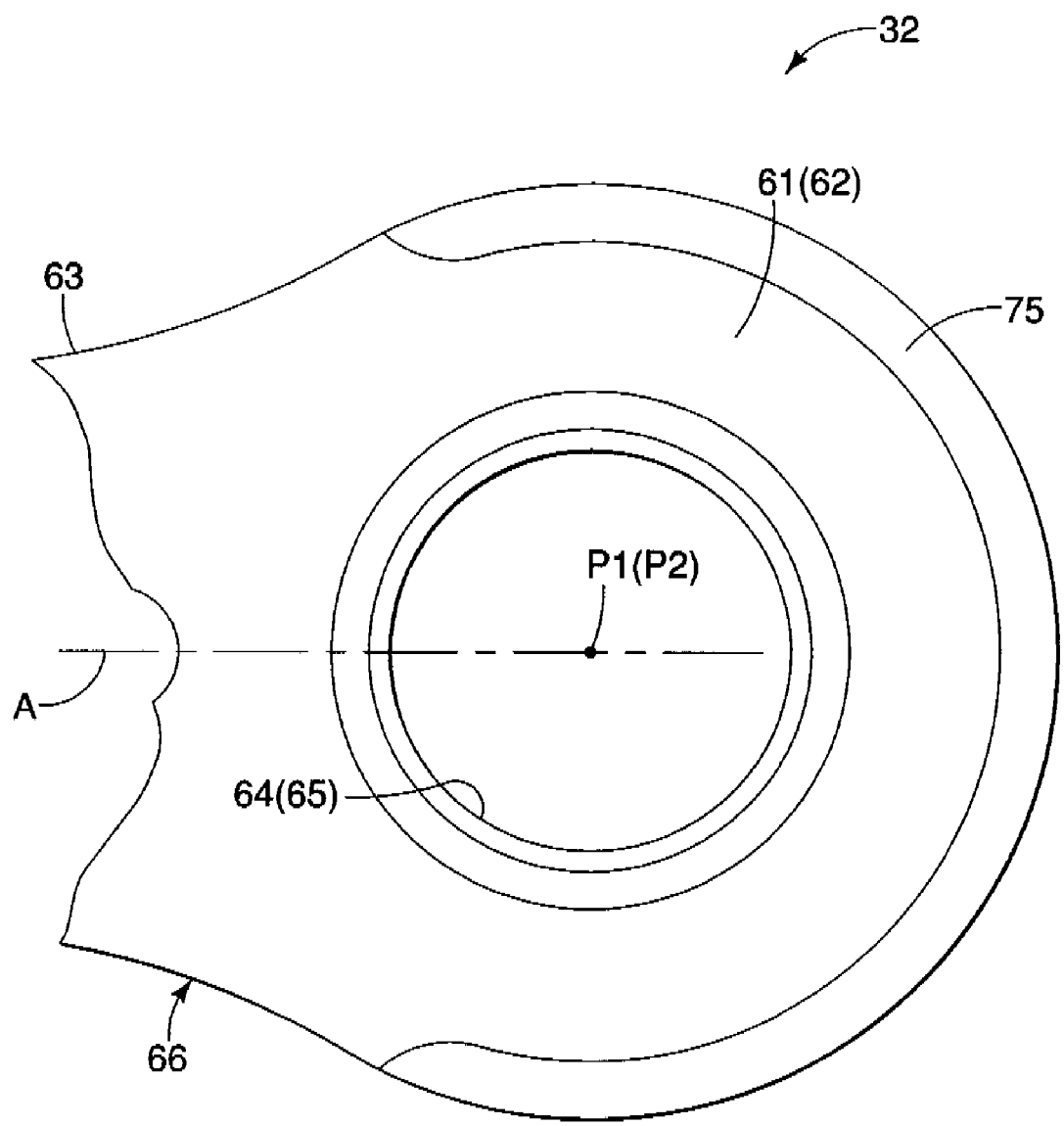
FIG. 24 is an enlarged elevational view of an end portion of the second or inside outer link plate illustrated in FIGS. 16 to 20 in accordance with the first embodiment of the present invention.
Figure 25:
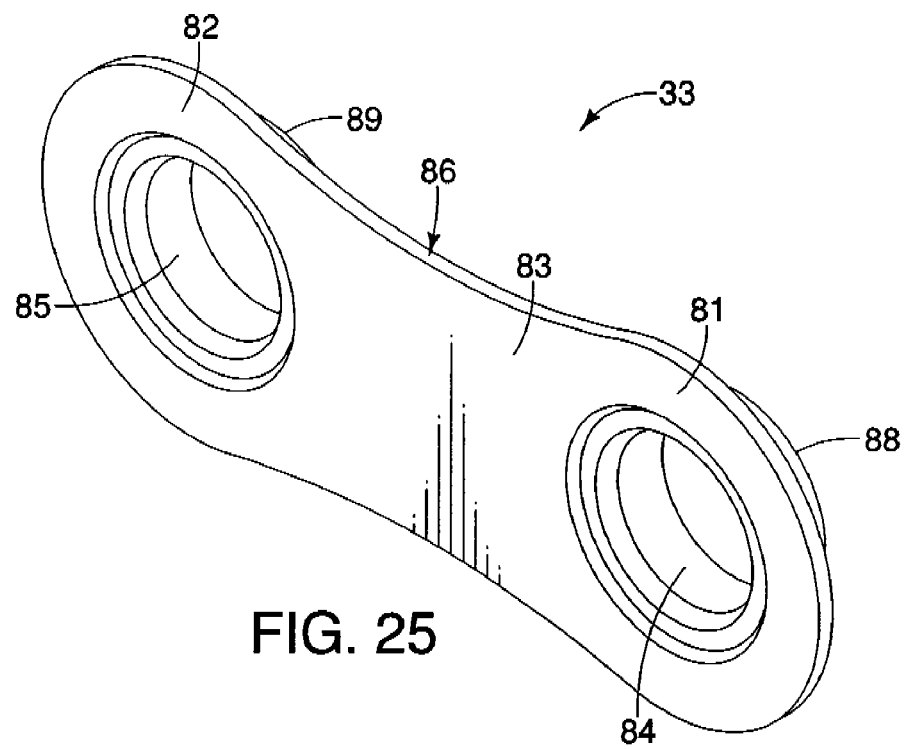
FIG. 25 is an outside perspective view of one of the first or outside inner link plates illustrated in FIGS. 3 and 4 in accordance with the first embodiment of the present invention.
Figure 26:
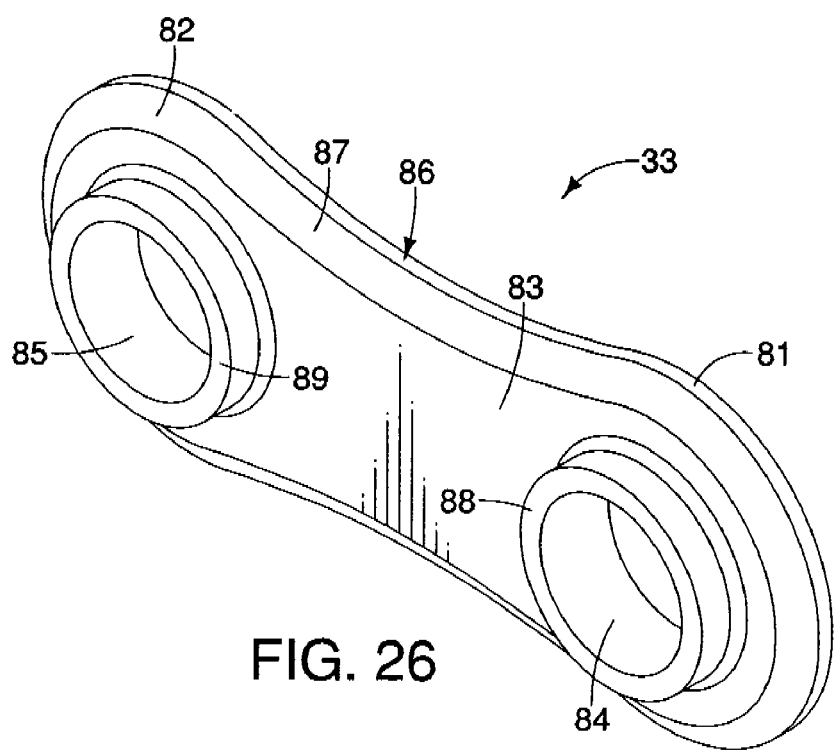
FIG. 26 is an inside perspective view of the first or outside inner link plate illustrated in FIG. 25 in accordance with the first embodiment of the present invention.

Referring to FIGS. 18 and 19, the first and second end portions 61 and 62 and the connecting portion 63 of the second outer link plate 32 define a second outer link peripheral edge 66 located between opposite side surfaces of the second outer link plate 32. Thus, the second outer link plate 32 has an exteriorly facing surface that faces away from the first outer link plate 31 and an interiorly facing surface that faces towards the first outer link plate 31. The connecting portion 63 of the second outer link plate 32 has an elongated hole 67 formed therein. The interiorly facing surface of the second connecting portion 63 is provided with an upper chamfered outer edge portion 63a extending along an upper edge section of the second outer link peripheral edge 66, and a lower chamfered outer edge portion 63b extending along a lower edge section of the second outer link peripheral edge 66. These upper and lower chamfered outer edge portions 63a and 63b aid in shifting by minimizing interference with the sprocket teeth. Optionally, annular tubular extensions are provided around the pin coupling openings 64 and 65. Thus, the interiorly facing surface of the second outer link plate 32 is a flat surface except for the upper and lower chamfered outer edge portions 63a and 63b and the annular tubular extensions that are provided around the pin coupling openings 64 and 65.

As seen in FIG. 18, the second outer link peripheral edge 66 includes a first end edge section 71, a second end edge section 72 and a pair of central edge sections 73 and 74. The second outer link peripheral edge 66 of the second (inside) outer link plate 32 is preferably a dog bone shape. The first end edge section 71 extends about the first end portion 61 of the second outer link plate 32. The second end edge section 72 extends about the second end portion 62 of the second outer link plate 32. The central edge sections 73 and 74 extend along the connecting portion 63 of the second outer link plate 32 between the first and second end portions 61 and 62 of the second outer link plate 32. A first chamfered outer edge portion 75 extends along a section of the second outer link peripheral edge 66 of the first end portion 61 of the second outer link plate 32. A second chamfered outer edge portion 77 extends along a section of the second outer link peripheral edge 66 of the first end portion 61 of the second outer link plate 32.

As best seen in FIGS. 18 and 19, the first and second end edge sections 71 and 72 of the first and second end portions 61 and 62 are at least semicircular, and more preferably extend 240 degrees along a singe arc. Thus, the overall shape of the first and second end portions 61 and 62 is larger than the first and second end portions 41 and 42 of the first outer link plates 31. The term "semicircular" as used herein refers to an arc that is equal one half of a circle. Thus, the first and second end edge sections 71 and 72 of the second outer link peripheral edge 66 of the first and second end portions 61 and 62 are dimensioned such that the overall length of the second outer link plates 32 is approximately 0.6 millimeters longer than the first outer link plates 31 for a conventional bicycle chain.

Referring now to FIGS. 25 to 33, the first (outside) inner link plates 33 will now be discussed in greater detail. Similar to the outer link plates 31 and 32, each of the first (outside) inner link plates 33 includes a first end portion 81, a second end portion 82 and a connecting portion 83 interconnecting the first and second end portions 81 and 82. The portions 81 to 83 of each of the first inner link plates 33 are preferably formed as a one-piece, unitary member from a hard, rigid material such as a metallic material that is known to be used for manufacturing bicycle chains. Also the first end portion 81 also has a pin coupling opening 84 for receiving one of the link pins 35 therein. Likewise, the second end portion 82 also has a pin coupling opening 85 for receiving one of the link pins 35 therein.

Figure 27:
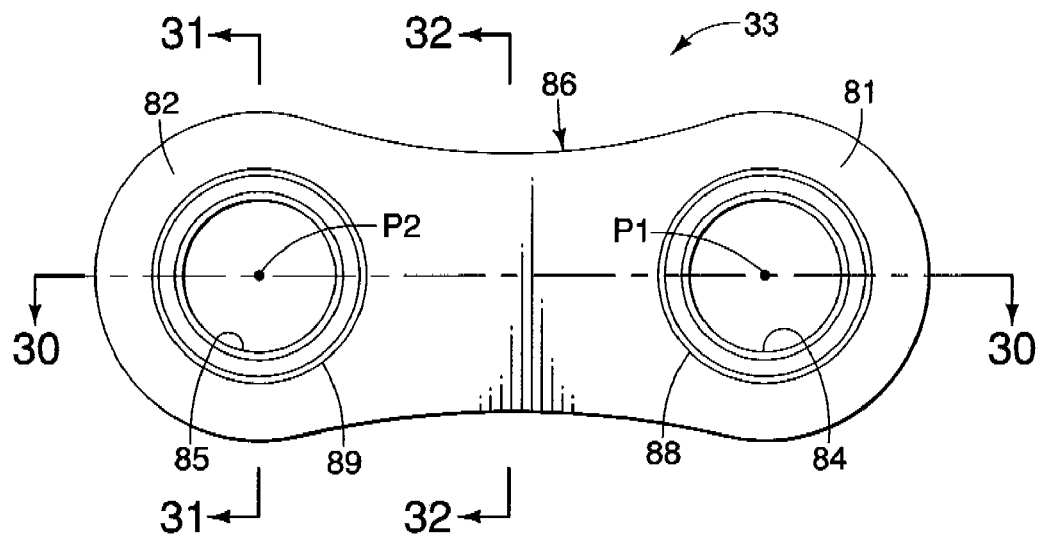
FIG. 27 is an outside elevational view of the first or outside inner link plate illustrated in FIGS. 25 and 26 in accordance with the first embodiment of the present invention.
Figure 28:
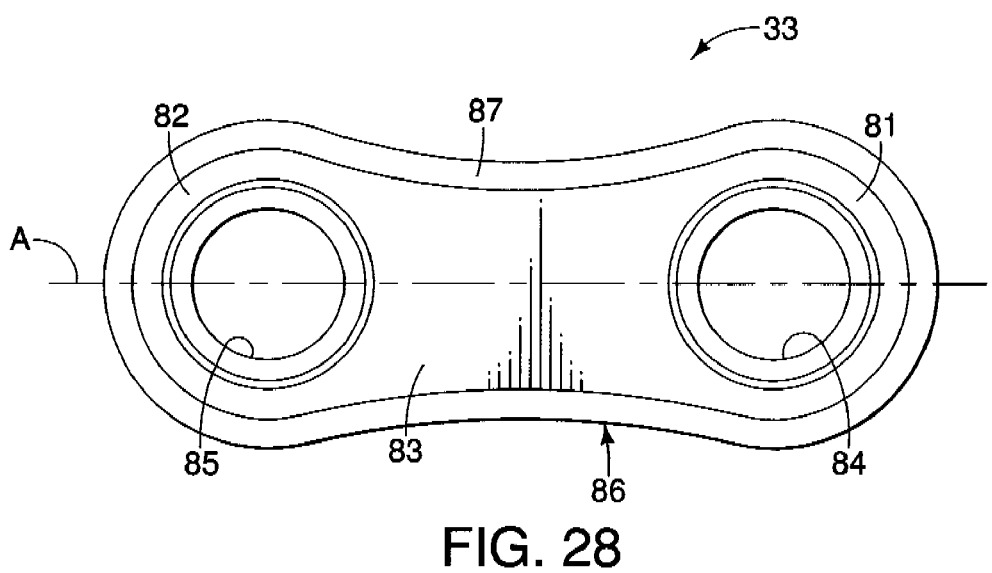
FIG. 28 is an inside elevational view of the first or outside inner link plate illustrated in FIGS. 25 to 27 in accordance with the first embodiment of the present invention.
Figure 29:
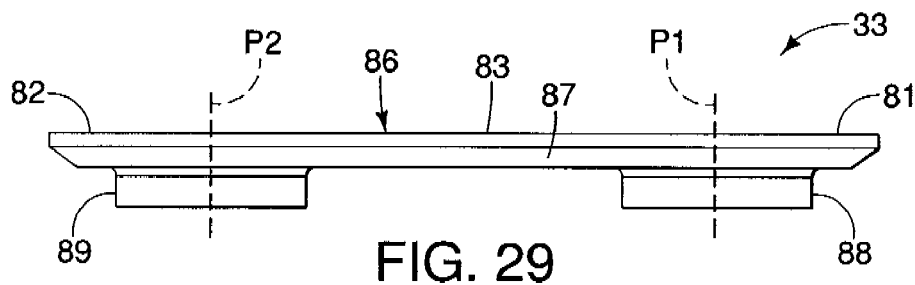
FIG. 29 is a top edge view of the first or outside inner link plate illustrated in FIGS. 25 to 28 in accordance with the first embodiment of the present invention.

The first inner link plate 33 is asymmetrical about the center longitudinal axis A passing through centers of the first and second pin coupling openings 84 and 85 in the first and second end portions 81 and 82. As seen in FIGS. 27 and 28, the lower part (below the center longitudinal axis A) of the connecting portion 83 of the first inner link plate 33 is slightly wider than the upper part (above the center longitudinal axis A) of the connecting portion 83 of the first inner link plate 33. On the other hand, the first and second end portions 81 and 82 are symmetrical about the center longitudinal axis A. This construction provides the inner links 38 with improved chain stability on the large front chain ring 26 of the front crankset 16.

Figure 33:
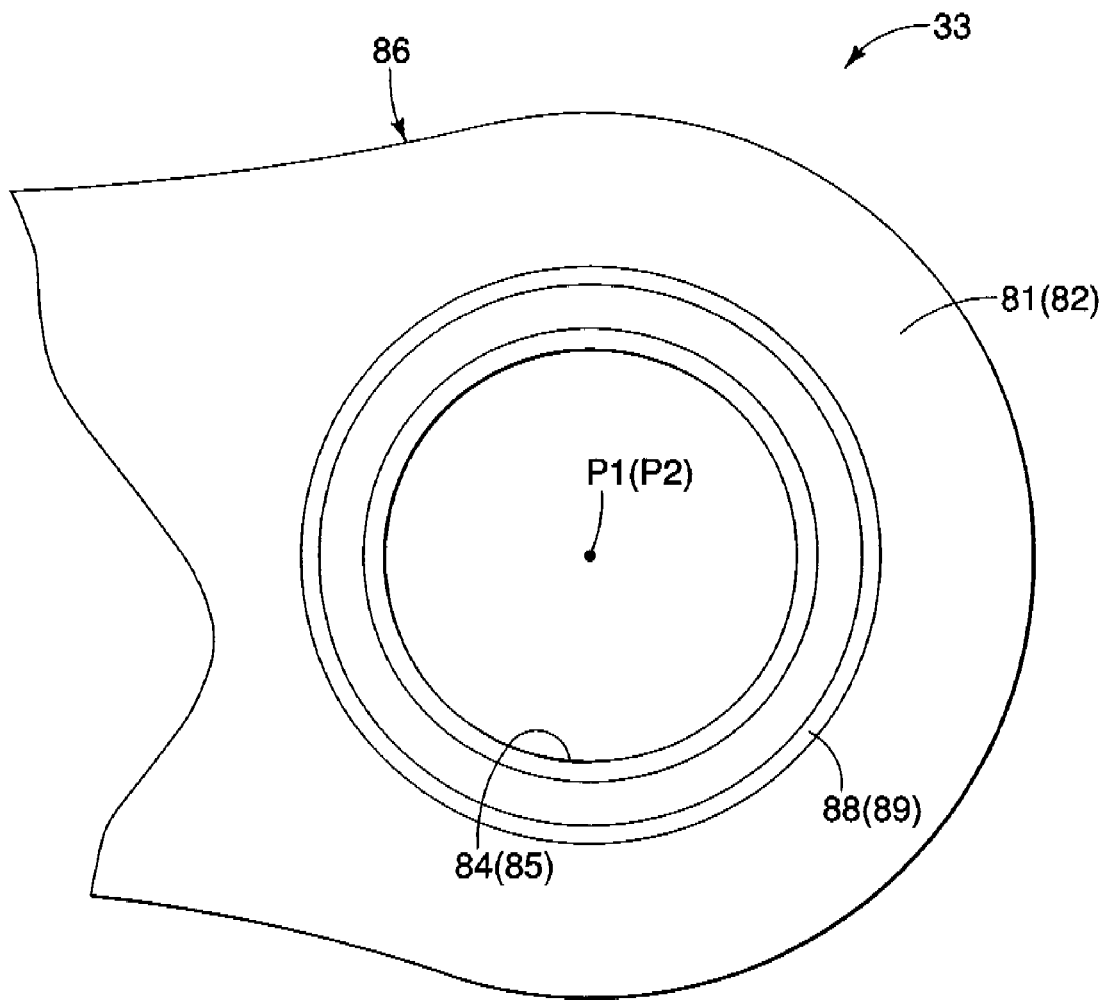
FIG. 33 is an enlarged elevational view of an end portion of the first or outside inner link plate illustrated in FIGS. 25 to 29 in accordance with the first embodiment of the present invention.
Figure 34:
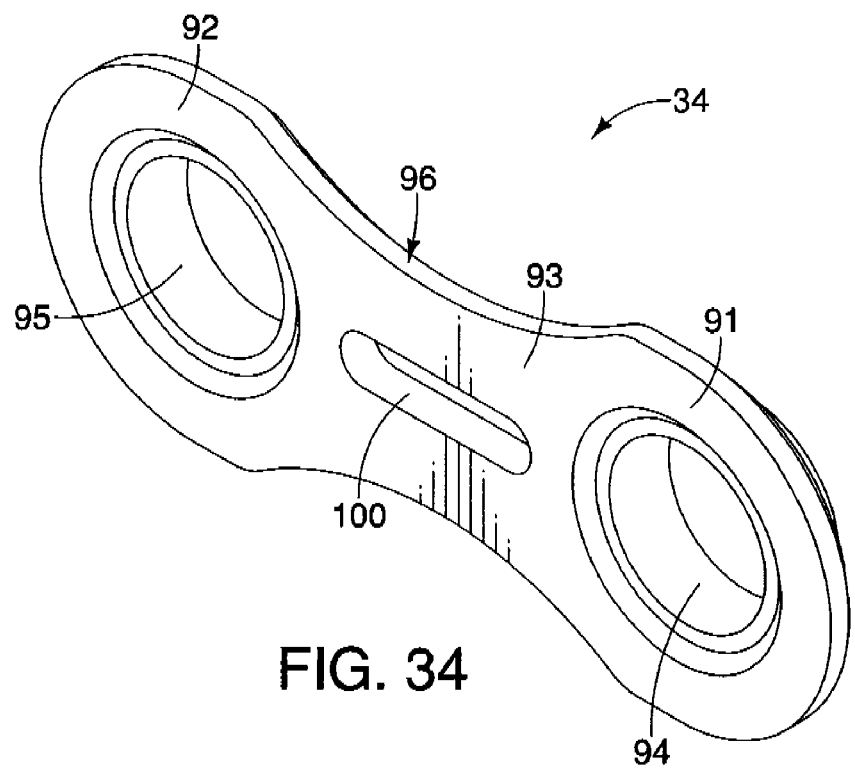
FIG. 34 is an outside perspective view of one of the second or inside inner link plates illustrated in FIGS. 3 and 4 in accordance with the first embodiment of the present invention.
Figure 35:
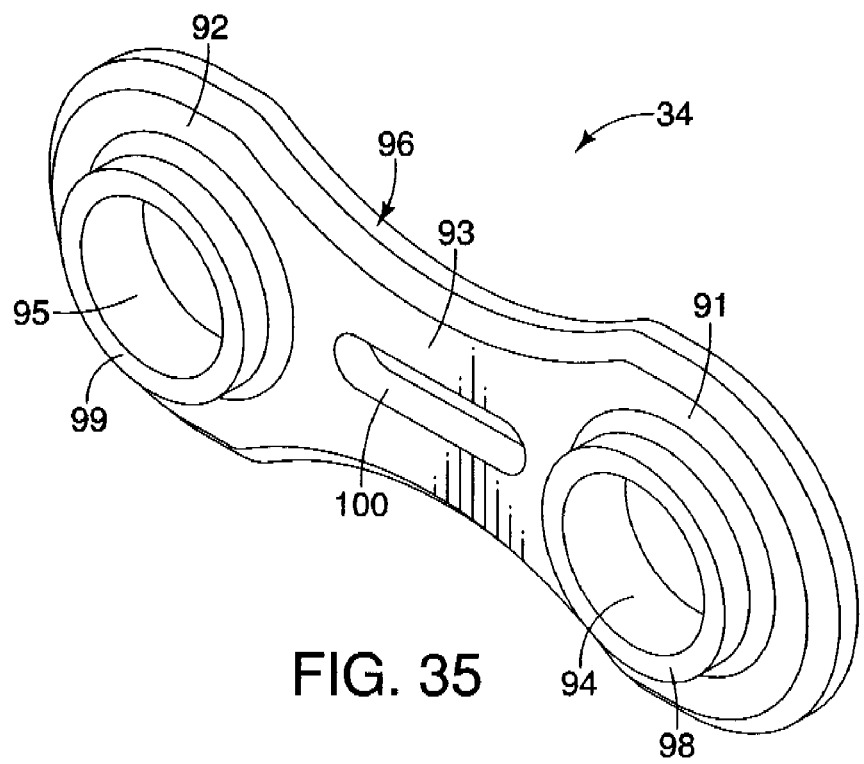
FIG. 35 is an inside perspective view of the second or inside inner link plate illustrated in FIG. 34 in accordance with the first embodiment of the present invention.

The first and second end portions 81 and 82 and the first connecting portion 83 of the first inner link plate 33 define a first inner link peripheral edge 86 located between opposite side surfaces of the first inner link plate 33. Thus, the first inner link plate 33 has an exteriorly facing surface that faces away from the second inner link plate 34 and an interiorly facing surface that faces towards the second inner link plate 34. The first inner link peripheral edge 86 of the first inner link plate 33 is preferably a dog bone shape. As seen in FIGS. 27 and 33, the exteriorly facing surface of the first inner link plate 33 is a flat surface, except for annular recesses around the first and second pin coupling openings 84 and 85. The interiorly facing surface of the first inner link plate 33 is a flat surface, except for a first chamfered outer edge portion 87 extending completely around the first inner link peripheral edge 86 and a pair of annular tubular extensions 88 and 89 provided around the pin coupling openings 84 and 85, respectively.

Referring now to FIGS. 34 to 42, the second (inside) inner link plates 34 will now be discussed in greater detail. Similar to other link plates, each of the second (inside) inner link plates 34 includes a first end portion 91, a second end portion 92 and a connecting portion 93 interconnecting the first and second end portions 91 and 92. The portions 91 to 93 of each of the second inner link plates 34 are preferably formed as a one-piece, unitary member from a hard, rigid material such as a metallic material that is known to be used for manufacturing bicycle chains. Also the first end portion 91 also has a pin coupling opening 94 for receiving one of the link pins 35 therein. Likewise, the second end portion 92 also has a pin coupling opening 95 for receiving one of the link pins 35 therein.

Figure 36:
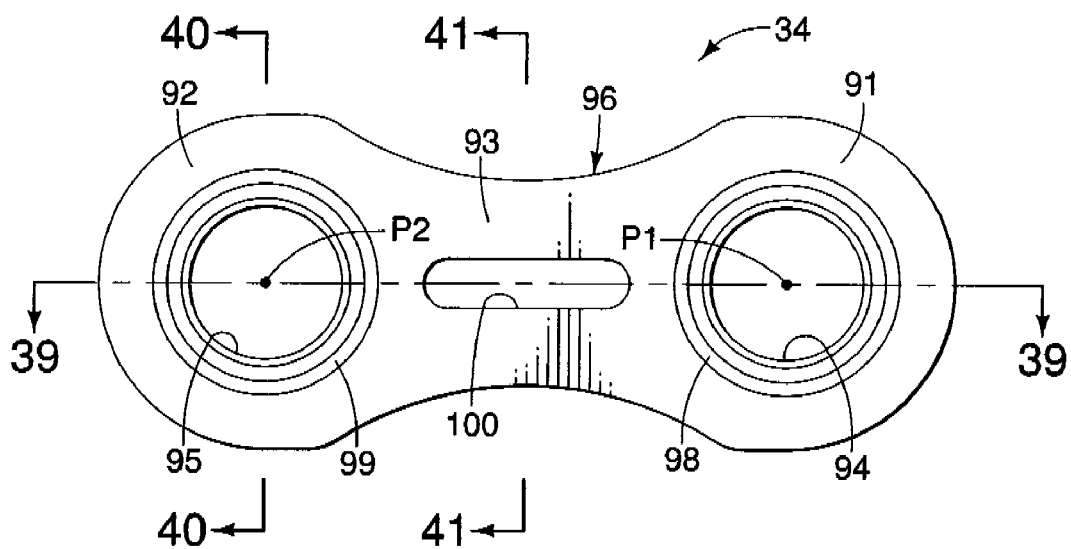
FIG. 36 is an outside elevational view of the second or inside inner link plate illustrated in FIGS. 34 and 35 in accordance with the first embodiment of the present invention.
Figure 37:
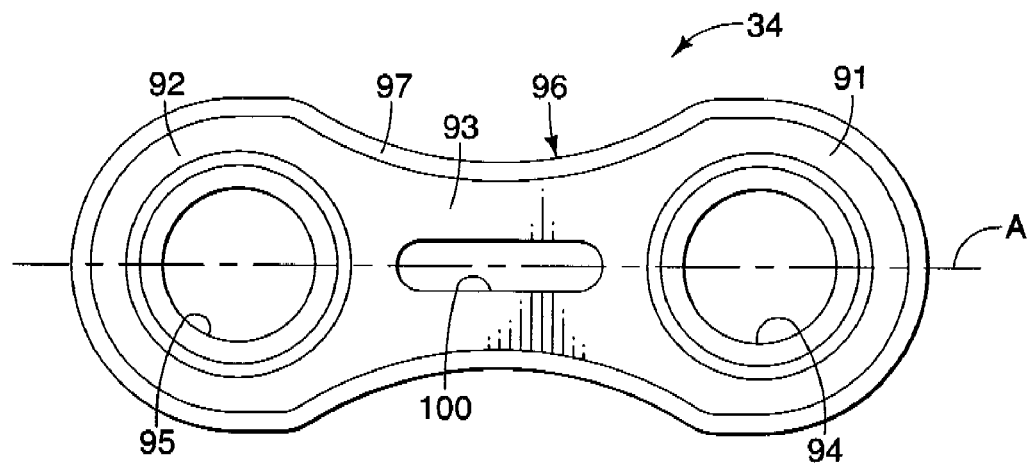
FIG. 37 is an inside elevational view of the second or inside inner link plate illustrated in FIGS. 34 to 36 in accordance with the first embodiment of the present invention.
Figure 38:
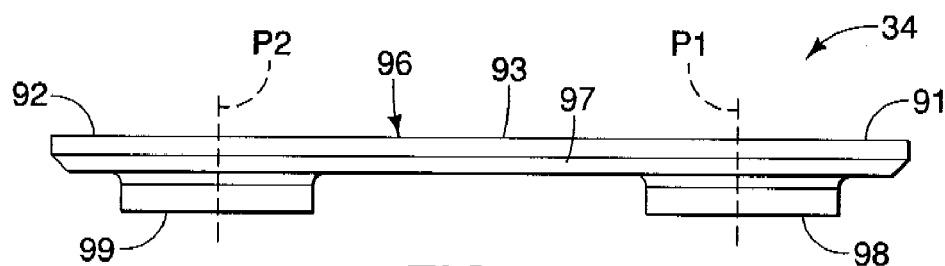
FIG. 38 is a top edge view of the second or inside inner link plate illustrated in FIGS. 34 to 37 in accordance with the first embodiment of the present invention.
Figure 42:
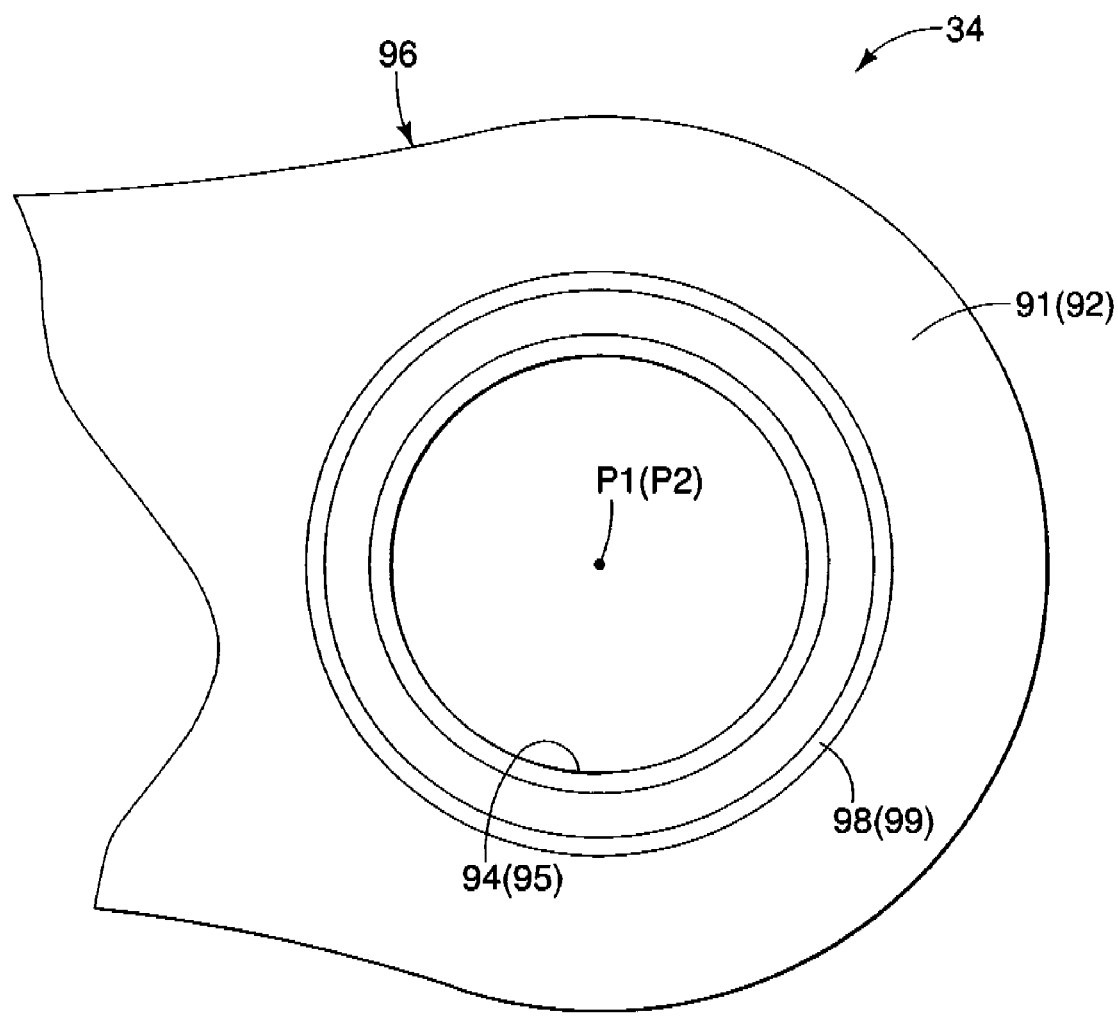
FIG. 42 is an enlarged elevational view of an end portion of the second or inside inner link plate illustrated in FIGS. 34 to 38 in accordance with the first embodiment of the present invention.
Figure 43:
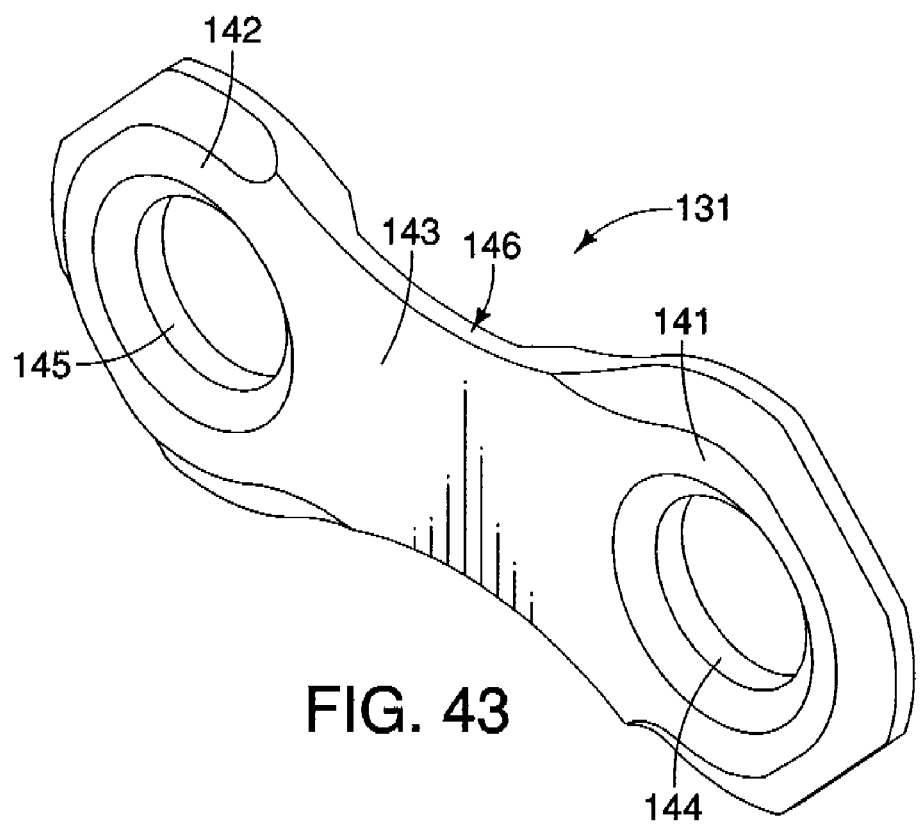
FIG. 43 is an outside perspective view of a first or outside outer link plate that can be in the bicycle chain illustrated in FIGS. 3 to 6 in accordance with a second embodiment of the present invention.
Figure 44:
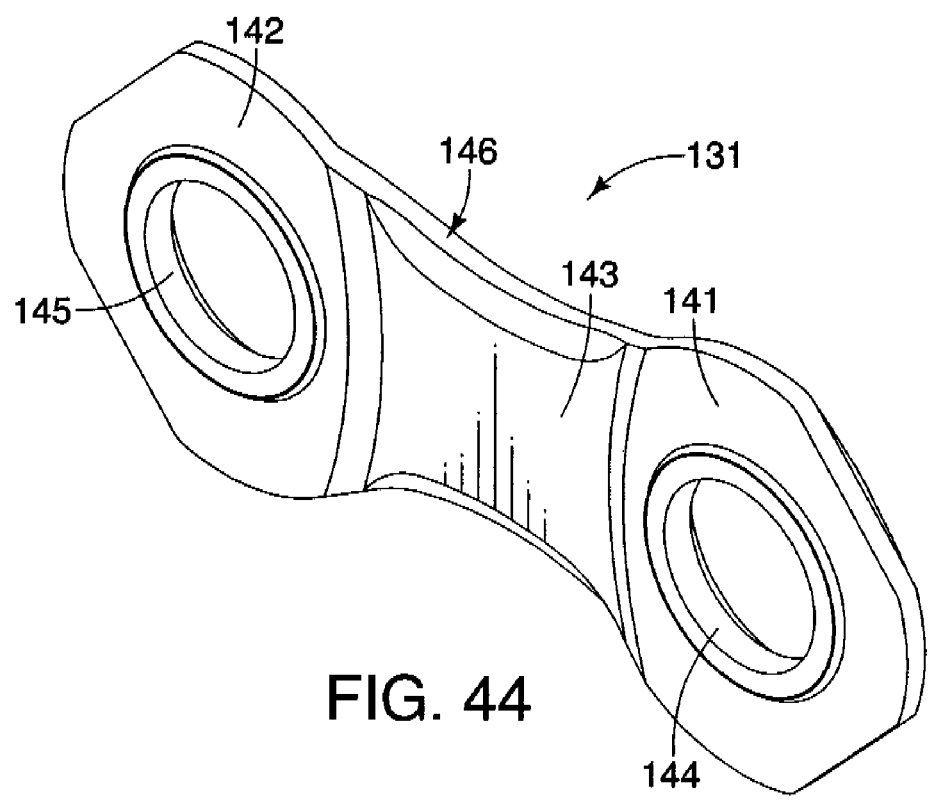
FIG. 44 is an inside perspective view of the first or outside outer link plate illustrated in FIG. 43 in accordance with the second embodiment of the present invention.

The first and second end portions 91 and 92 and the first connecting portion 93 of the second inner link plate 34 define a second inner link peripheral edge 96 located between opposite side surfaces of the second inner link plate 34. Thus, the second inner link plate 34 has an exteriorly facing surface that faces away from the first inner link plate 33 and an interiorly facing surface that faces towards the second first inner link plate 33. The second inner link peripheral edge 96 of the second inner link plate 34 is preferably a dog bone shape. As seen in FIGS. 36 and 39, the exteriorly facing surface of the second inner link plate 34 is a flat surface, except for annular recesses around the first and second pin coupling openings 94 and 95. The interiorly facing surface of the second inner link plate 34 is a flat surface, except for a second chamfered outer edge portion 97 extending completely around the second inner link peripheral edge 96 and a pair of annular tubular extensions 98 and 99 provided around the pin coupling openings 94 and 95, respectively. The connecting portion 93 of the second inner link plate 34 preferably has an elongated hole 100 formed therein.

Basically, the second inner link plate 34 is identical to the first inner link plate 33, except for the inner link peripheral edges 86 and 96 are different and the second inner link plate 34 has the elongated hole 100 in the connecting portion 93. In particular, the connecting portion 83 of the first inner link plate 33 has a minimum width measured perpendicularly from the longitudinal axis A that is wider than a minimum width of the connecting portion 93 of the second inner link plate 34. This construction provides the inner links 38 with improved chain stability on the large front chain ring 26 of the front crankset 16 without a need to modify the rear sprocket set 18.

Referring now to FIGS. 43 to 50, a first (outside) outer link plates 131 will now be discussed in accordance with a second embodiment. The first (outside) outer link plate 131 is identical to the first (outside) outer link plates 31, discussed above, except that the interior surfaces of the outer link plates 31 and 131 are different. In other words, the outer peripheral edges and the exterior surfaces of the outer link plates 31 and 131 are identical. Thus, the outer link plate 131 can be used in the chain of the first embodiment by replacing each of the outer link plates 31 with the outer link plate 131.

Figure 45:
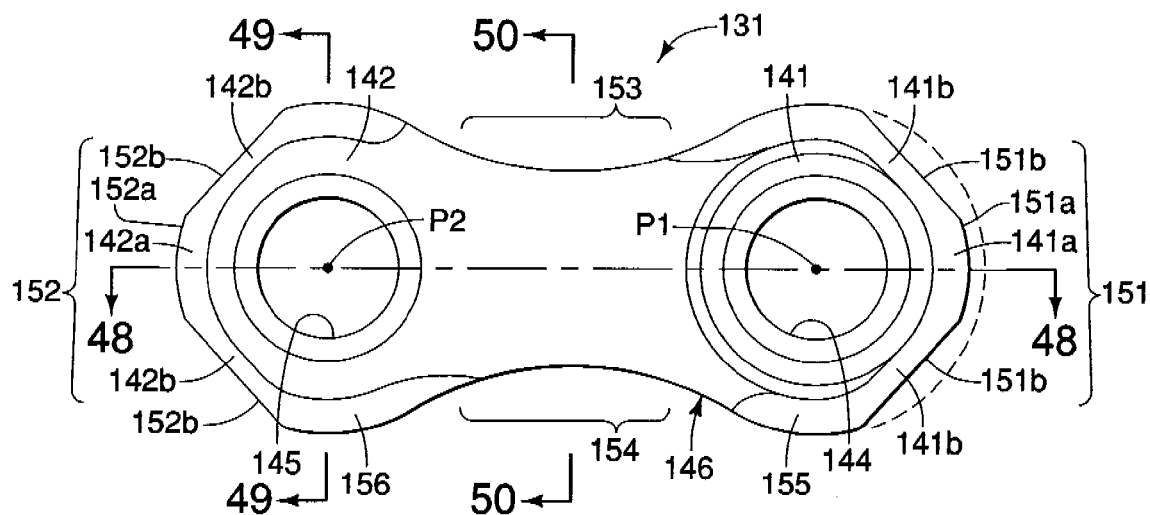
FIG. 45 is an outside elevational view of the first or outside outer link plates illustrated in FIGS. 43 and 44 in accordance with the second embodiment of the present invention.

Basically, the first (outside) outer link plate 131 includes a first end portion 141, a second end portion 142 and a connecting portion 143 interconnecting the first and second end portions 141 and 142. The portions 141 to 143 of each of the first outer link plates 131 are preferably formed as a one-piece, unitary member from a hard, rigid material such as a metallic material that is known to be used for manufacturing bicycle chains. Also the first end portion 141 also has a pin coupling opening 144 for receiving one of the link pins 35 therein. Likewise, the second end portion 142 also has a pin coupling opening 145 for receiving one of the link pins 35 therein. The pin coupling openings 144 and 145 have center points that define first and second pivot axes P1 and P2 as seen in FIG. 45. A longitudinal axis A of the first and second outer link plates 131 and 132 bisects the connecting portion 143 and the pin coupling openings 144 and 145, i.e., passes through the pivot axes P1 and P2 of the pin coupling openings 144 and 145.

Figure 46:
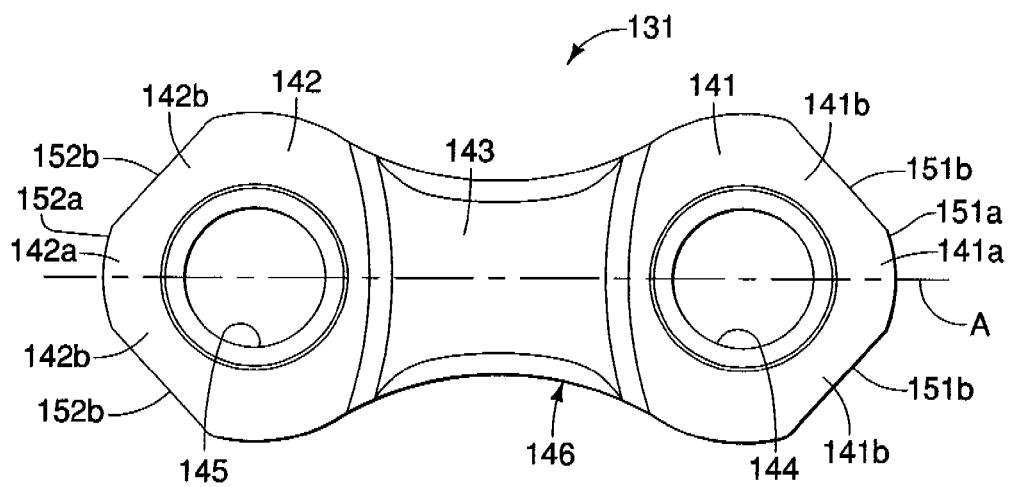
FIG. 46 is an inside elevational view of the first or outside outer link plate illustrated in FIGS. 43 to 45 in accordance with the second embodiment of the present invention.
Figure 47:
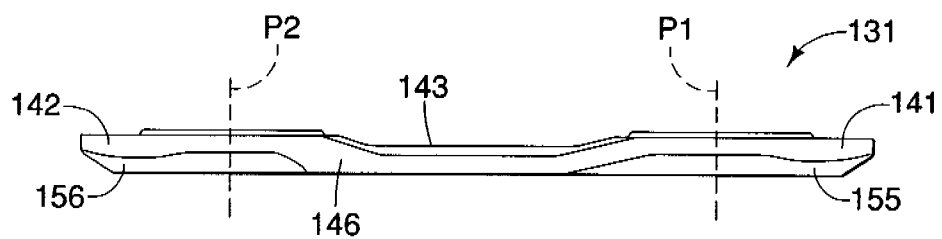
FIG. 47 is an edge view of the first or outside outer link plate illustrated in FIGS. 43 to 46 in accordance with the second embodiment of the present invention.
Figure 51:
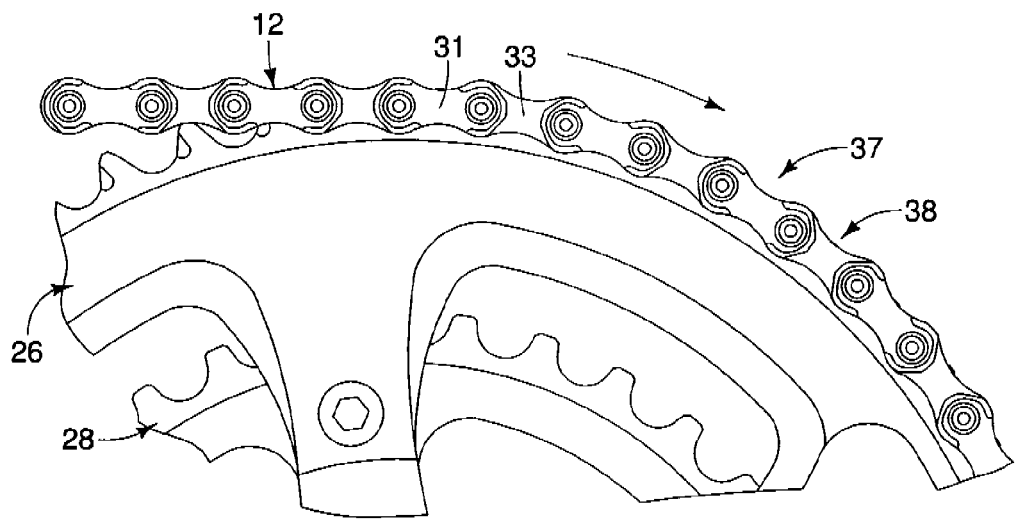
FIG. 51 is an enlarged outside elevational view of a portion of the front bicycle crankset with the chain on the outer chain ring.
Figure 52:
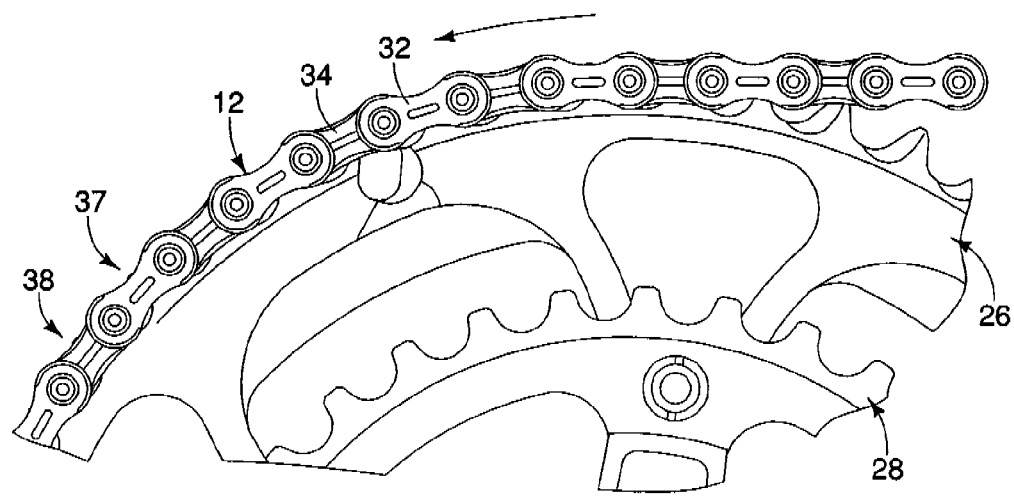
FIG. 52 is an enlarged inside elevational view of a portion of the front bicycle crankset with the chain on the outer chain ring as seen in FIG. 51.
Figure 53:
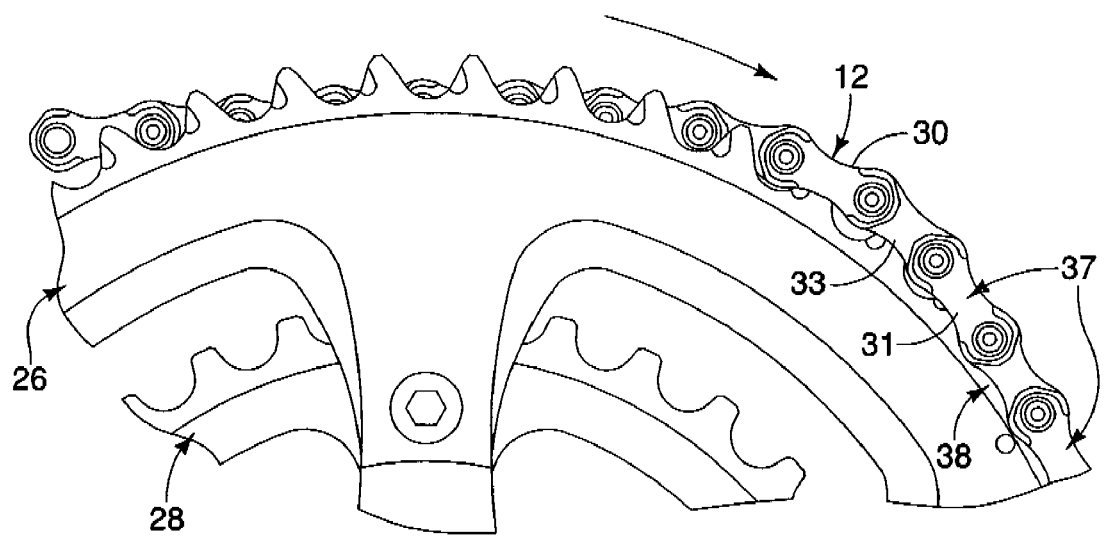
FIG. 53 is an enlarged outside elevational view of a portion of the front bicycle crankset with the chain being moved laterally off of the outer chain ring.
Figure 54:
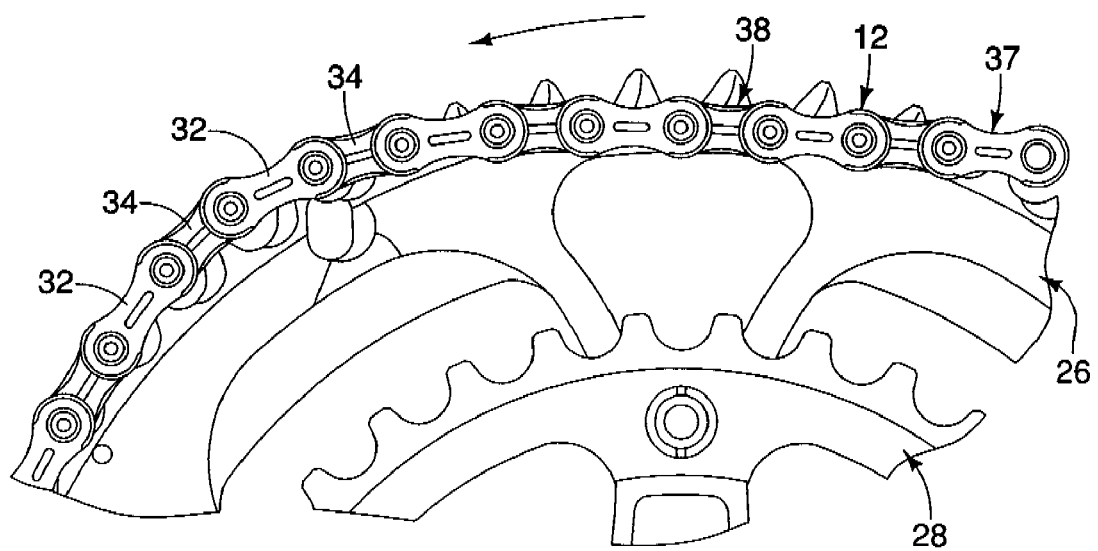
FIG. 54 is an enlarged inside elevational view of a portion of the front bicycle crankset with the chain being moved laterally off of the outer chain ring as seen in FIG. 53.
Figure 55:
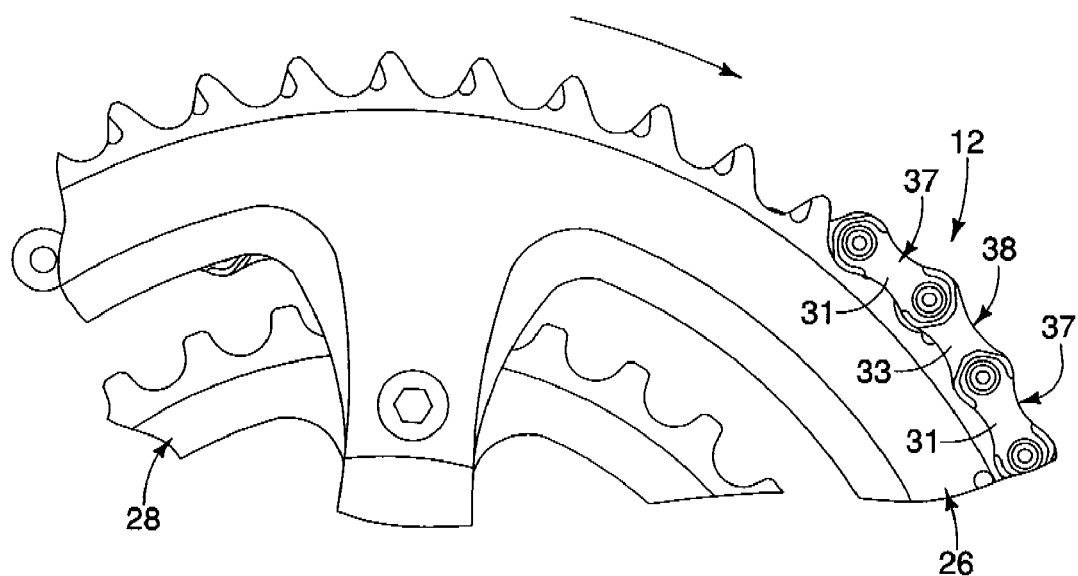
FIG. 55 is an enlarged outside elevational view of a portion of the front bicycle crankset with the chain being moved laterally off of the outer chain ring, but just prior to engagement with the inner chain ring.
Figure 56:
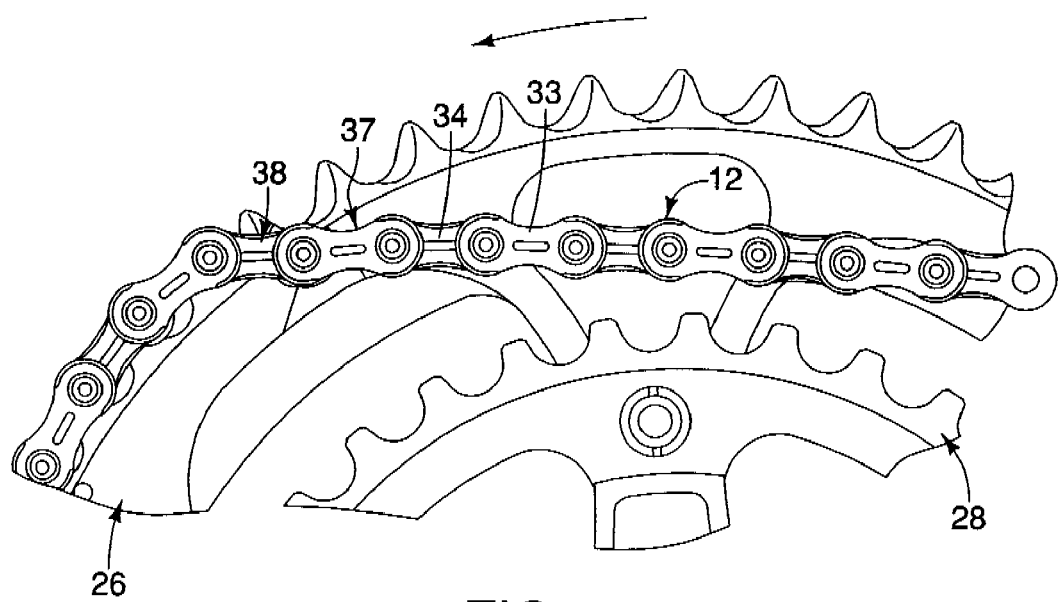
FIG. 56 is an enlarged inside elevational view of a portion of the front bicycle crankset with the chain being moved laterally off of the outer chain ring, but just prior to engagement with the inner chain ring as seen in FIG. 55.
Figure 57:
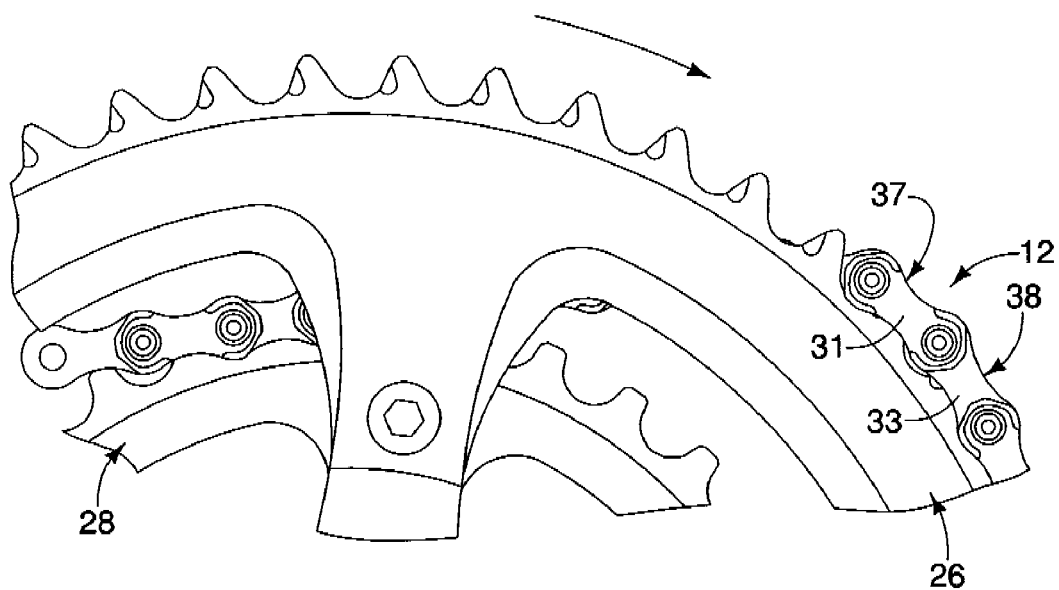
FIG. 57 is an enlarged outside elevational view of a portion of the front bicycle crankset with the chain being moved laterally off of the outer chain ring, just prior after engagement with the inner chain ring.
Figure 58:
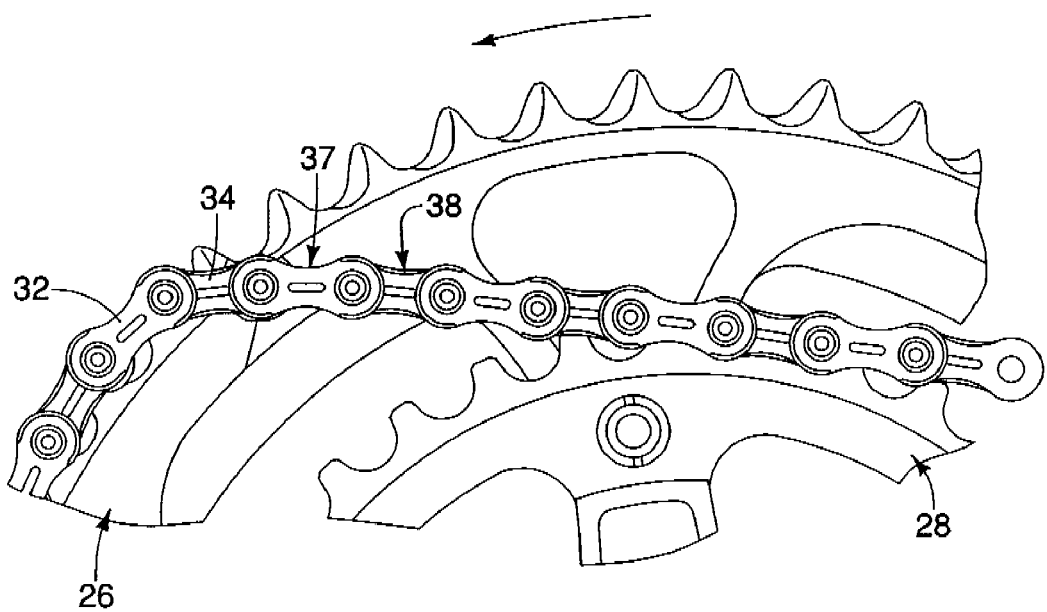
FIG. 58 is an enlarged inside elevational view of a portion of the front bicycle crankset with the chain being moved laterally off of the outer chain ring, just prior after engagement with the inner chain ring as seen in FIG. 57.
Figure 59:
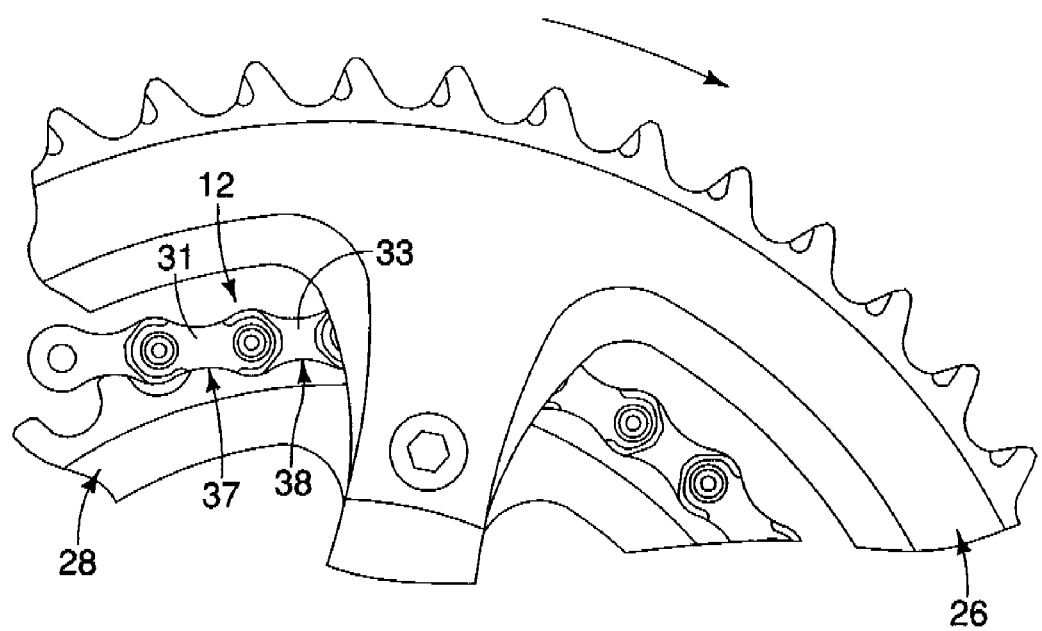
FIG. 59 is an enlarged outside elevational view of a portion of the front bicycle crankset with the chain completely transferred to the inner chain ring.
Figure 60:
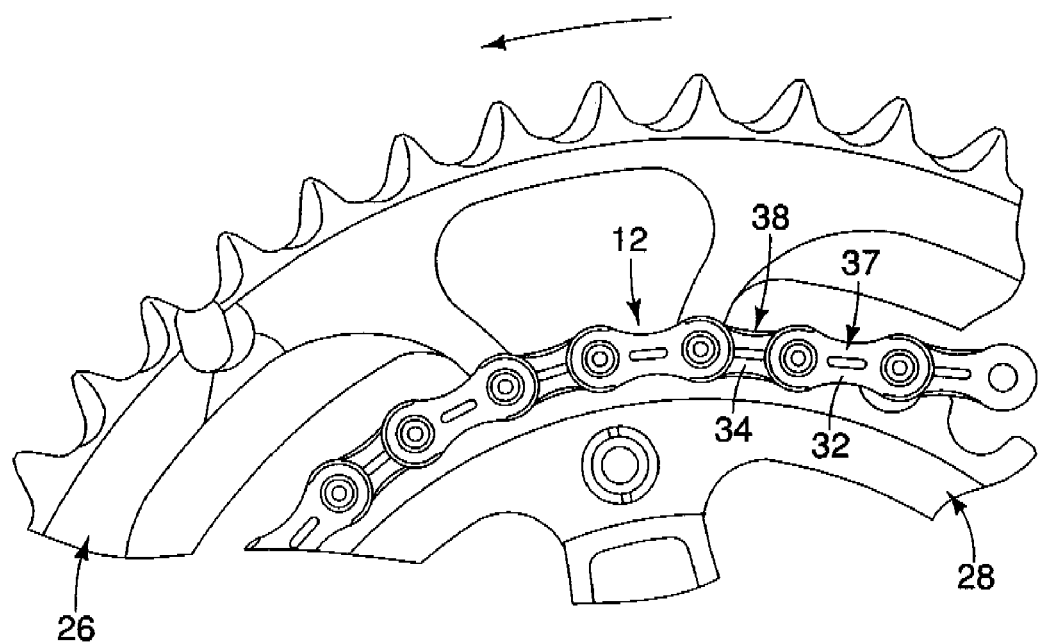
FIG. 60 is an enlarged inside elevational view of a portion of the front bicycle crankset with the chain completely transferred to the inner chain ring as seen in FIG. 59.

Referring now to FIGS. 45 to 47, the first and second end portions 141 and 142 and the connecting portion 143 of the first outer link plate 131 define a first outer link peripheral edge 146 located between opposite side surfaces of the first outer link plate 131. The first outer link peripheral edge 146 includes a first end edge section 151, a second end edge section 152 and a pair of central edge sections 153 and 154. The first end edge section 151 extends about the first end portion 141 of the first outer link plate 131. The second end edge section 152 extends about the second end portion 142 of the first outer link plate 131. The central edge sections 153 and 154 extend along opposite edges of the connecting portion 143 of the first outer link plate 131 between the first and second end portions 141 and 142 of the first outer link plate 131. Thus, the first outer link plate 131 has an exteriorly facing surface with a first chamfered outer edge portion 155 extending along the first end edge section 151 of the first outer link peripheral edge 146 of the first end portion 141 and a second chamfered outer edge portion 156 extending along the second end edge section 152 of the first outer link peripheral edge 146 of the second end portion 142. The first end portion 141 has a large area part 141a defined by a middle edge part 151a of the first outer link peripheral edge 146 located at the longitudinal axis A and a pair of reduced area parts 141b defined by a pair of flat edge parts 151b of the first outer link peripheral edge 146. Similarly, the second end portion 142 has a large area part 142a defined by a middle edge part 152a of the first outer link peripheral edge 146 located at the longitudinal axis A and a pair of reduced area parts 142b defined by a pair of flat edge parts 152b of the first outer link peripheral edge 146.

The first outer link plate 131 has an interiorly facing surface with the first connecting portion 143 being recessed with respect to the first and second end portions 141 and 142 on the interiorly facing surface. Thus, the connecting portion 143 of the first outer link plate 131 has a minimum thickness along the longitudinal axis A that is smaller than a minimum thickness of the first and second end portions 141 and 142 along the longitudinal axis, excluding the chamfered outer edge portions 155 and 156.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with a chain of the present invention. Accordingly, these terms, as utilized to describe the present invention should be interpreted relative to a bicycle equipped with a chain of the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle chain comprising:
   a first outer link plate including
      a first end portion with a first pin coupling opening,
      a second end portion with a second pin coupling opening, and
      a first connecting portion interconnecting the first and second end portions of the first outer link plate,
      the first and second end portions and the first connecting portion of the first outer link plate defining a first outer link peripheral edge, and
      the first outer link plate including an exteriorly facing surface with a first chamfered outer edge portion extending along a section of the first outer link peripheral edge of the first end portion and a first reduced area part having a reduced radial dimension with respect to a radial dimension of a portion lying along a longitudinal axis of the first outer link plate, with the radial dimensions being measured radially from an edge of the first pin coupling opening in the first outer link plate to the first outer link peripheral edge along a line that extends from a first pivot axis of the first pin coupling opening in the first outer link plate;
a second outer link plate including
   a first end portion with a first pin coupling opening,
   a second end portion with a second pin coupling opening, and
   a second connecting portion interconnecting the first and second end portions of the second outer link plate,
   the first and second end portions and the second connecting portion of the second outer link plate defining a second outer link peripheral edge with the first and second outer link peripheral edges of the first and second outer link plates being shaped differently;
a first inner link plate including
   a first end portion with a first pin coupling opening,
   a second end portion with a second pin coupling opening, and
   a first connecting portion interconnecting the first and second end portions of the first inner link plate;
a second inner link plate including
   a first end portion with a first pin coupling opening,
   a second end portion with a second pin coupling opening, and
   a second connecting portion interconnecting the first and second end portions of the second inner link plate,
   the first connecting portion of the first inner link plate having a minimum width that is wider than a minimum width of the second connecting portion of the second inner link plate; and
a first link pin connecting the first end portions of the first and second outer link plates to the second end portions of the first and second inner link plates.

2. The bicycle chain according to claim 1, wherein the connecting portion of the second outer link plate has a hole formed therein.

3. The bicycle chain according to claim 1, wherein the connecting portion of the second inner link plate has a hole formed therein.

4. The bicycle chain according to claim 1, wherein the first outer link plate is asymmetrical about a center longitudinal axis passing through centers of the first and second pin coupling openings in the first and second end portions of the first outer link plate.

5. The bicycle chain according to claim 1, wherein the first chamfered outer edge portion is asymmetrical arranged relative to the longitudinal axis passing through the first pivot axis of the first pin coupling opening in the first outer link plate, and extends at least more than ninety degrees from in both directions as measured about the first pivot axis of the first pin coupling opening in the first outer link plate.

6. The bicycle chain according to claim 1, wherein the second end portion of the first outer link plate includes a second chamfered outer edge portion extending along a section of the first outer link peripheral edge of the second end portion and a second reduced area part having a reduced radial dimension with respect to a radial dimension of a portion lying along the longitudinal axis, with the radial dimensions being measured radially from an edge of the second pin coupling opening in the first outer link plate to the first outer link peripheral edge along a line that extends from a second pivot axis of the first pin coupling opening in the first outer link plate.

7. The bicycle chain according to claim 1, wherein the first chamfered outer edge portion extends at least 180 degrees around the first pivot axis.

8. The bicycle chain according to claim 1, wherein the first outer link plate has an interiorly facing surface with the first connecting portion having an upper chamfered outer edge portion formed extending along an upper edge section of the first outer link peripheral edge, and a lower chamfered outer edge portion extending along a lower edge section of the first outer link peripheral edge.

9. The bicycle chain according to claim 8, wherein the upper and lower chamfered outer edge portions are asymmetrical about a transverse plane bisecting the first outer link plate and perpendicular to the longitudinal axis of the first outer link plate.

10. The bicycle chain according to claim 1, wherein the first outer link plate has an interiorly facing surface with the first connecting portion being recessed with respect to the first and second end portions of the first outer link plate on the interiorly facing surface.

11. The bicycle chain according to claim 10, wherein the first connecting portion of the first outer link plate has a minimum thickness along the longitudinal axis of the first outer link plate that is smaller than a minimum thickness of the first end portion of the first outer link plate along the longitudinal axis, excluding the first chamfered outer edge portion.

12. The bicycle chain according to claim 1, wherein the second outer link plate has an interiorly facing surface with the second connecting portion having an upper chamfered outer edge portion extending along an upper edge section of the second outer link peripheral edge, and a lower chamfered outer edge portion extending along a lower edge section of the second outer link peripheral edge.

13. The bicycle chain according to claim 1, wherein the second outer link plate includes a first chamfered outer edge portion extending along a section of the second outer link peripheral edge of the first end portion of the second outer link plate, and a second chamfered outer edge portion extending along a section of the second outer link peripheral edge of the second end portion of the second outer link plate.

14. The bicycle chain according to claim 1, wherein the first and second end portions and the first connecting portion of the first inner link plate define a first inner link peripheral edge, with a first chamfered outer edge portion formed on an interiorly facing surface and extending completely around the first inner link peripheral edge.

15. The bicycle chain according to claim 1, wherein the first and second end portions and the first connecting portion of the second inner link plate define a second inner link peripheral edge, with a second chamfered outer edge portion formed on an interiorly facing surface and extending completely around the second inner link peripheral edge.

* * * * *